United States Patent [19]

Raue et al.

[11] 4,006,127
[45] Feb. 1, 1977

[54] CATIONIC DIAZACYANINE DYESTUFFS

[75] Inventors: Roderich Raue, Leverkusen; Hans-Lothar Dorsch, Cologne, both of Germany

[73] Assignee: Bayer Aktiengesellschaft, Leverkusen, Germany

[22] Filed: Oct. 5, 1973

[21] Appl. No.: 403,790

[30] Foreign Application Priority Data

Oct. 5, 1972 Germany .................... 2248738

[52] U.S. Cl. .............. 260/146 R; 260/146 D; 260/147; 260/154; 260/155; 260/156; 260/157; 260/158; 260/160; 260/162; 260/163

[51] Int. Cl.² .................................. C09B 43/00

[58] Field of Search .......... 260/146 R, 146 D, 147, 260/154, 155, 156, 157, 158, 160, 161, 162, 163

[56] References Cited

UNITED STATES PATENTS

| | | |
|---|---|---|
| 2,464,785 | 3/1949 | Thompson .................. 260/155 X |
| 2,864,812 | 12/1958 | Bossard et al. ............. 260/154 X |
| 3,086,002 | 4/1963 | Baumann et al. ........... 260/155 X |
| 3,101,988 | 8/1963 | Bossard et al. ............. 260/156 X |
| 3,169,954 | 2/1965 | Straley et al. .................. 260/158 |
| 3,206,452 | 9/1965 | Straley et al. .................. 260/155 |
| 3,213,081 | 10/1965 | Straley et al. .................. 260/155 |
| 3,415,807 | 12/1968 | Fisher et al. .................... 260/158 |
| 3,518,247 | 6/1970 | Altermatt et al. ........... 260/154 X |
| 3,663,528 | 5/1972 | Ramanathan ................ 260/147 X |
| 3,699,092 | 10/1972 | Weaver et al. ................. 260/155 |
| 3,770,719 | 11/1973 | Fisher et al. .................... 260/158 |
| 3,804,823 | 4/1974 | Fisher et al. ................. 260/152 X |

FOREIGN PATENTS OR APPLICATIONS

697,445 11/1964 Canada ............... 260/156

*Primary Examiner*—Charles F. Warren
*Attorney, Agent, or Firm*—Plumley and Tyner

[57] ABSTRACT

Dyestuffs of the formula

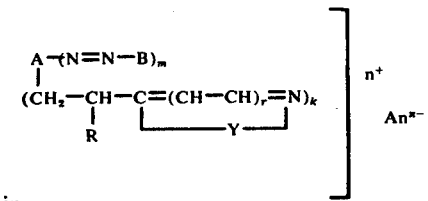

wherein
A denotes a ring which contains at least one quaternary nitrogen atom;
B denotes an isocyclic or heterocyclic radical;
Y denotes a radical for completing a ring;
R denotes hydrogen or alkyl;
An⁻ denotes an anion; and
k, m and n denote 1 or 2, are suitable for dyeing and printing of natural and synthetic materials, particularly of polyacrylonitrile, copolymers of acrylonitrile with other vinyl compounds, of acid modified polyesters and acid modified polyamides. The dyestuffs are also useful in writing fluids, rubber stamp inks, ball point pen inks and in inks for flexographic printing.

17 Claims, No Drawings

CATIONIC DIAZACYANINE DYESTUFFS

The invention relates to new cationic dyestuffs of the general formula

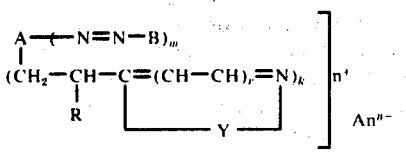

wherein

A denotes a ring which contains at least one quaternary nitrogen atom and to which further rings are optionally fused;

B denotes an isocyclic or heterocyclic radical;

Y denotes a radical for completing a ring, to which further rings are optionally fused;

R denotes hydrogen or alkyl;

$An^-$ denotes an anion; and $k$, $m$ and $n$ denote 1 or 2, it being possible for $k$, $m$ and $n$ to be identical or different and $r$ denotes 0 or 1 and the radicals A, B and Y are optionally substituted further but do not contain any sulphonic acid groups.

Further subjects of the invention are the manufacture of these dyestuffs and their use for dyeing and printing synthetic and natural materials.

Suitable radicals A are, for example, radicals of the thiazole, isothiazole, benzthiazole, benzisothiazole, pyrazole, indazole, imidazole, benzimidazole, oxazole, isoxazole, selenazole, isoselenazole, oxadiazole, thiadiazole, triazole, dihydrotriazole, tetrazole, pyridine, quinoline, isoquinoline, pyridazine and pyrazine series which are quaternised at the nitrogen.

Suitable radicals B are, for example, radicals of the pyrazole, benzene, naphthalene, morpholine, benzomorpholine, tetrahydroquinoline, carbazole, lilolidine, julolidine, perimidine, benzimidazole, indoline and indole series as well as methylene compounds of the benzimidazoline, indoline, benzthiazoline and dihydropyridine series.

The radical Y serves in particular to complete a pyridine, pyrimidine, quinoline, thiazole, benzthiazole, imidazole to benzimidazole ring system.

The alkyl radical R can be straight-chain or branched and preferably possesses 1 – 4 C atoms.

Suitable substituents of the radicals A, B and Y are the substituents customary in the chemistry of cationic dyestuffs, for example alkyl, aryl, aralkyl, cycloalkyl, nitrile, nitro, halogen, amino, hydroxyl, alkyloxy, aryloxy and aralkoxy, alkylmercapto, arylmercapto and aralkylmercapto, acyl, acylamino, aminocarbonyl, carboxyl, alkyloxycarbonyl(oxy), aryloxycarbonyl(oxy) and aralkyloxycarbonyl(oxy), aryloxysulphonyl or ureido. An alkyl radical is understood as a radical preferably containing 1 to 12 C atoms, which can be further substituted by the abovementioned substituents, for example hydroxyethyl, methoxycarbonylethyl, dimethylaminoethyl or trifluoromethyl. Aryl is preferably understood as phenyl and naphthyl, which can in turn be substituted by the radicals mentioned.

Examples of suitable cycloalkyl radicals are cyclopentyl and cyclohexyl.

Possible anionic radicals $An^-$ are the organic and inorganic anions which are customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such as nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of formic acid, acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, 0-ethylglycollic acid, thioglycollic acid, glyceric acid, malic acid, dodecyl-tetraethylene glycolether-propionic acid, 3-(nonyloxy)-propionic acid, 3-(isotridecyloxy)-propionic acid, 3-(isotridecyloxy)-diethylene glycolether-propionic acid, the ether-propionic acid of the alcohol mixture with 6 to 10 carbon atoms, thioacetic acid, 6-benzoylamino-2-chlorocaproic acid, nonylphenyl-tetraethylene glycolether-propionic acid, nonylphenol-diethylene glycol-etherpropionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2.2.4- and 2,4,4-trimethyladipic acid, sebacic acid, isosebacic acid (isomer mixture), tartaric acid, citric acid, glyoxylic acid, dimethyl ester-$\alpha,\alpha'$-dicarboxylic acid, methylene-bis-thioglycollic acid, dimethyl sulphide-$\alpha,\alpha$-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid and Mersolat, that is to say $C_8-C_{15}$ paraffinsulphonic acid, obtained by chlorosulphonation of paraffin oil.

Examples of suitable anions of cycloaliphatic carboxylic acids are the anions of cyclohexanecarboxylic acid and cyclohexene-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5nitroisophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 2-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of a heterocyclic sulphonic acid is the anion of quinoline-5-sulphonic acid.

Further anions which can be used are those of arylsulphinic, arylphosphonic and arylphosphonous acids, such as benzenesulphinic acid and benzenephosphonic acid.

Colourless anions are preferred. For dyeing from an aqueous medium, anions which do not excessively impair the solubility of the dyestuff in water are preferred.

For dyeing from organic solvents, anions which assist the solubility of the dyestuff in organic solvents or at least do not influence it adversely are frequently also preferred.

The anion is in general decided by the manufacturing process and by the purification of the crude dyestuff which may be carried out. In general the dyestuffs are in the form of zinc chloride double salts or halides (especially chlorides or bromides). The anions can be replaced by other anions in a known manner.

A preferred group of the new dyestuffs corresponds to the general formula

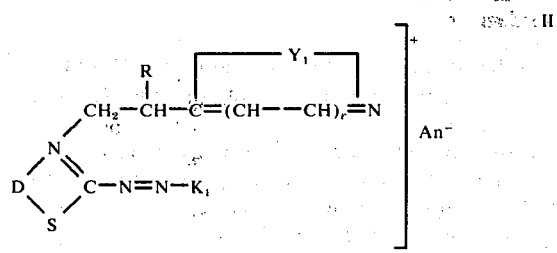

wherein

R, An⁻ and r have the meaning indicated in the formula I and,

D denotes a member for completing a thiazole or benzthiazole ring, $K_1$ denotes a 4-aminophenyl, 4-aminonaphthyl, 5-aminopyrazolyl-(4) or indolyl-(3) radical or a radical of the formula

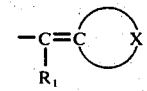

$R_1 = CN$, $CONH_2$ or $COOH$,

X = a member for completing a benzimidazoline, indoline, benzthiazoline or dihydropyridine ring and $Y_1$ denotes a member for completing a pyridine, quinoline, imidazole, benzimidazole, thiazole, benzthiazole or pyrimidine ring, it being possible for the amino groups and the cyclic radicals to carry substituents, with the exception of sulphonic acid groups.

A further preferred group corresponds to the general formula

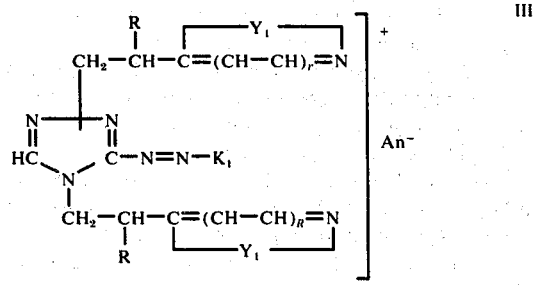

wherein

R, $K_1$, $Y_1$, An⁻ and r have the meaning indicated in the formula II.

Amongst the dyestuffs of the general formula II there should be singled out those of the general formulae

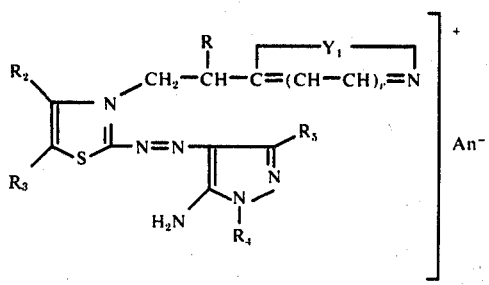

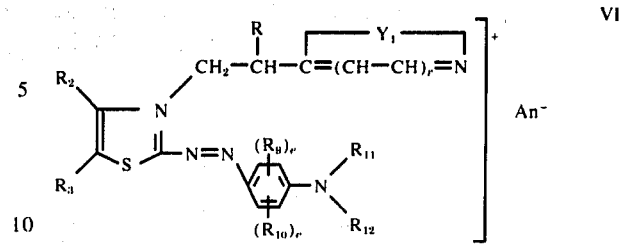

wherein
R, $Y_1$, $An^-$ and r have the meaning indicated in the formula II and $R_2$ and $R_3$ independently of one another represent hydrogen, $C_1$-$C_4$-alkyl, phenyl, halogen, nitro, nitrile, thiocyano, $C_1$-$C_4$-alkoxy, phenoxy, benzyloxy, $C_1$-$C_4$-alkylmercapto, $C_1$-$C_4$-alkylsulphonyl, aminosulphonyl, acetyl, benzoyl, acetylamino, benzoylamino, $C_1$-$C_4$-alkylsulphonylamino, $C_1$-$C_4$-alkoxycarbonyl, phenoxycarbonyl, aminocarbonyl or carboxyl or conjointly denote a ring member for closing a cyclohexene or benzene ring, and can in turn be substituted by the substituents indicated for $R_2/R_3$, $R_4$ denotes hydrogen, $C_1$-$C_4$-alkyl, phenyl, cyclohexyl or benzyl and $R_5$ denotes hydrogen, $C_1$-$C_4$-alkyl or $C_1$-$C_4$-alkoxy and wherein
R, $Y_1$, $An^-$ and r have the meaning indicated in the formula II and $R_9$ denotes hydrogen, halogen, $C_1$-$C_4$-alkyl, nitrile, $C_1$-$C_4$-alkoxy, $C_1$-$C_2$-alkylcarbonyloxy, amino, $C_1$-$C_2$-alkylcarbonylamino, nitro or ureido, $R_{10}$ denotes hydrogen, $C_1$-$C_4$-alkyl, $C_1$-$C_4$-alkoxy, $C_1$-$C_4$-alkylcarbonylamino or, conjointly with $R_9$, a member for closing a benzene ring, e denotes the number 1 or 2 and $R_{11}$ and $R_{12}$ independently of one another denote hydrogen, $C_1$-$C_{12}$-alkyl, phenyl, benzyl, or optionally substituted amino or conjointly denote a ring member for closing a morpholine, piperidine, pyrrolidine, piperazine or thiomorpholine ring, and wherein $R_9$ and $R_{11}$ can conjointly represent a member for closing a morpholine, tetrahydropyridine, indole, imidazole or pyrroline ring and

wherein
R, $Y_1$, $An^-$ and r have the meaning indicated in the formula II and
$K_2$ denotes radicals of the formulae

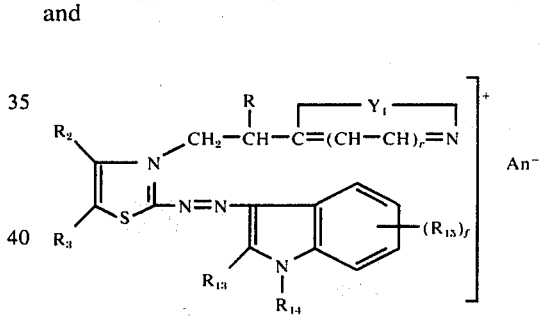

wherein
R, $Y_1$, $An^-$ and r have the meaning indicated in the formula II and
$R_{13}$ represents $C_1$-$C_6$-alkyl, phenyl or benzyl,
$R_{14}$ represents hydrogen, $C_1$-$C_6$-alkyl, $C_3$-$C_6$-alkenyl or $C_3$-$C_6$-alkinyl, benzyl or phenylethyl,
$R_{15}$ represents hydrogen, $C_1$-$C_4$-alkyl, $C_1$-$C_4$-alkoxy or halogen and

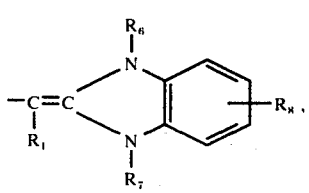
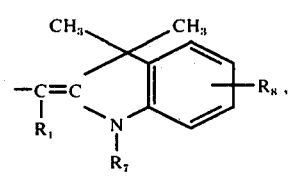
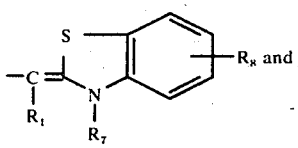
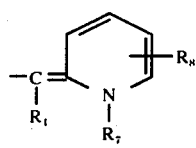

in which
$R_1$ = CN, $CONH_2$ or COOH,
$R_6$ and $R_7$ = $C_1$-$C_4$-alkyl and
$R_8$ = hydrogen, $C_1$-$C_4$-alkyl, $C_1$-$C_4$-alkoxy, halogen or acetylamino,
and f represents the number 1 or 2.

Amongst the dyestuffs of the general formula III there should be singled out those of the general formulae

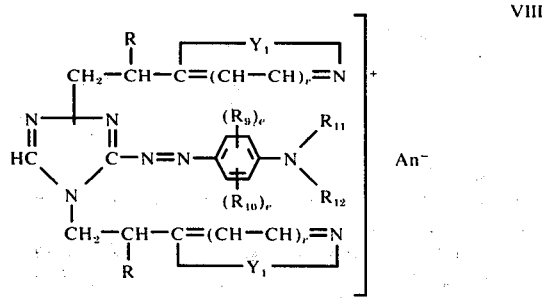
VIII wherein
R, $Y_1$, $R_9$, $R_{10}$, $R_{11}$, $R_{12}$, $An^-$, e and r have the meaning indicated in the formulae II or VI
and

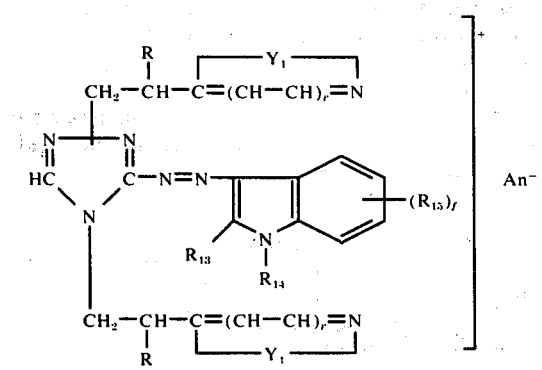
IX wherein
R, $Y_1$, $R_{13}$, $R_{14}$, $R_{15}$, $An^-$, f and r have the meaning indicated in the formulae II or VII.

According to the invention, the dyestuffs of the formula I are obtained by reaction of an azo compound of the formula $$A + N = N - B)_m \qquad X$$

with a heterocyclic vinyl compound of the formula

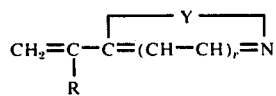
XI wherein A, B, Y, R, r and m have the abovementioned meaning, in the presence of acids.

A further process for the manufacture of these dyestuffs consists of reacting the azo dyestuffs of the formula X with β-hydroxyethyl-heterocyclic compounds of the formula

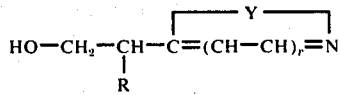
XII wherein the meaning of the symbols R, r and Y corresponds to that of the formula I in the presence of acids.

The azo dyestuffs of the formula X employed as starting products can be manufactured according to known methods, for example a. by coupling a diazotised amine $A(NH_2)_m$ to a component BH capable of coupling, b. by condensation of a heterocyclic amine $A(NH_2)_m$ with a nitroso compound B-NO, c. by condensation of a heterocyclic halide $A-(Hal)_m$ with a hydrazine $B-NH-NH_2$ and subsequent oxidation, d. by coupling a diazonium compound to a heterocyclic compound AH or e. by oxidative coupling of a hydrazine $A-(N-H-NH_2)_m$ to the coupling component BH.

Amongst these most important methods of manufacture of the azo compounds of the formula X, one or other is more suitable depending on the chosen coupling component or diazo component. Suitable amines $A(NH_2)_m$ are, for example, the following compounds, which can, instead of the amino group, be substituted by halogen or hydrazine if they are to be employed according to manufacturing methods c and e.

2-Amino-benzthiazole, 2-amino-6-methoxy-benzthiazole, 2-amino-6-ethoxy-benzthiazole, 2-amino-6-phenyloxy-benzthiazole, 2-amino-6-chloro(bromo)-benzthiazole, 2-amino-6-methyl(ethyl)-benzthiazole, 2-amino-6-acetylamino-benzthiazole, 2-amino-6-carbomethoxy(ethoxy)-benzthiazole, 2-amino-6-phenylamino-benzthiazole, 2-amino-6-methylsulphonyl-benzthiazole, 2-amino-6-nitro-benzthiazole, 2-amino-6-methylthiobenzthiazole, 2-amino-6-cyano-benzthiazole, 2-amino-6-sulphamoyl-benzthiazole, 2-amino-6-dimethylsulphamoyl-benzthiazole, 2-amino-6-thiocyanato-benzthiazole, 2-amino-6-carbamoyl-benzthiazole, 2-amino-6-β-hydroxyethyl-benzthiazole, 2-amino-6-β-cyanoethylthio-benzthiazole, 2-amino-6-β-cyanoethylsulphonyl-benzthiazole, 2-amino-6-trifluoromethyl-benzthiazole, 2-amino-6-bis-trifluoromethyl-hydroxymethyl-benzthiazole, 2-amino-6-phenylsulphonylamino-benzthiazole, 2-amino-6-β-hydroxyethylsulphonyl-benzthiazole, 2-amino-6-acetyl-benzthiazole, 2-amino-6-carbonamido-benzthiazole, 2-amino-6-phenoxysulphonyl-benzthiazole, 2-amino-6-(3'-methoxyphenoxysulphonyl)-benzthiazole, 2-amino-6-(4'-methyl-2'-nitro-phenoxysulphonyl)-benzthiazole, 2-amino-6-(3'-dimethylamino-phenoxysulphonyl)-benzthiazole, 2-amino-5-(4'-tert.-butyl-phenoxysulphonyl)-benzthiazole, 2-amino-4-methyl-benzthiazole, 2-amino-4-methylsulphonyl-benzthiazole, 2-amino-5-methyl-benzthiazole, 2-amino-5,6-dimethyl(dimethoxy)-benzthiazole, 2-amino-4,6-dimethyl-benzthiazole, 2-amino-4,7-dimethoxy-benzthiazole, 2-amino-4,6-dichloro-benzthiazole, 2-aminonaphtho[1,2-d]-thiazole, 2-amino-8-ethoxy-naphtho-[2,1-d]-thiazole, 2-amino-6,7,8,9-tetrahydro-naphtho[2,1-d]-thiazole, 2-amino-4,5,6,7-tetrahydro-benzthiazole, 2-amino-5,5-dimethyl-7-oxo-4,5,6,7-tetrahydro-benzthiazole, 2,6-diamino-benzo(1,2-d:4,5-d')-bis-thiazole, 3-amino-2,1-benzisothiazole, 3-amino-4,7-dimethyl-2,1-benzisothiazole, 3-amino-6,7-dichloro-2,1-benzisothiazole, 3-amino-6-cyano-2,1-benzthiazole, 3-amino-5-(N,N-dimethylsulphonamido)-2,1-benzisothiazole, 2-amino-thiazole, 2-amino-4-methylthiazole, 2-amino-4n-butyl-thiazole, 2-amino-4-trifluoromethyl-thiazole, 2-amino-4-chloromethyl-thiazole, 2-amino-4-phenyl-thiazole, 2-amino-4-(3'-nitro)-phenyl-thiazole, 2-amino-4-(4'-nitro)-phenylthiazole, 2-amino-4-(4'-methoxy)-phenyl-thiazole, 2-amino-4-[4'-bromo(chloro)]-phenyl-thiazole, 2-amino-4-methoxy thiazole, 2-amino-4-hydroxymethyl-thiazole, 2-amino-4-acetylthiazole, 2-amino-4-acetylamino-thiazole, 2-amino-4-dimethyl-aminomethyl-thiazole, 2-amino-4-carboethoxy-thiazole, 2-amino-4-cyano-thiazole, 2-amino-4-piperidinomethyl-thiazole, 2-amino-4-morpholinomethyl-thiazole, 2-amino-5-nitro-thiazole, 2-amino-5-cyano-thiazole, 2-amino-5-phenyl-thiazole, 2-amino-5-methyl-thiazole, 2-amino-5-methylsulphonyl-thiazole, 2-amino-5-methylmercapto-thiazole, 2-amino-5-ethoxy(methoxy)carbonyl-thiazole, 2-amino-5-phenoxycarbonyl-thiazole, 2-amino-5-acetyl-thiazole, 2-amino-5-methoxy-thiazole, 2-amino-5bromo(chloro)-thiazole, 2-amino-5-thiocyanato-thiazole, 2-amino-5-ethoxycarbonylmethylthio-thiazole, 2-amino-4-phenyl-5-nitro-thiazole, 2-amino-4,5-dimethyl-thiazole, 2-amino-4-methyl-5-ethyl-thiazole, 2-amino-4-phenyl-5-methyl-thiazole, 2-amino-4-ethyl-5-methyl-thiazole, 2-amino-4-methyl-5-β-(hydroxyethyl)-thiazole, 2-amino-4,5-diphenyl-thiazole, 2-amino-4-ethoxycarbonyl-5-methyl-thiazole, 2-amino-4-carboethoxy-5-methyl-thiazole, 2-amino-4-bromo-5-phenyl-thiazole, 2-amino-4-methyl-5-bromo-thiazole, 2-amino-4-methyl(phenyl)-5-acetyl-thiazole, 2-amino-4-phenyl-5-benzoyl-thiazole, 2-amino-4-methylthiazole-5-carboxylic acid, 2-amino-4-phenylthiazole-5-carboxylic acid, 2-amino-4-methyl(phenyl)-thiazole-5-carboxylic acid ethyl ester, 2-amino-4-methyl(phenyl)-5-ethoxycarbonyl-thiazole, 2-amino-4-phenylthiazole-5-carboxylic acid amide, 2-amino-4-methylthiazole-5-carboxylic acid amide, 2-amino-4-methylthiazole-5-carboxylic acid n-butylamide, 2-amino-4-methylthiazole-5-carboxylic acid dimethylamide, 2-amino-4-methylthiazole-5-carboxylic acid anilide, 2-amino-4-methylthiazole-5-carboxylic acid p-toluidide, 2-amino-4-methylthiazole-5-carboxylic acid p-chloroanilide, 2-amino-4-methylthiazole-5-carboxylic acid α-naphthylamide, 2-amino-4-phenyl-5-thiocyanato-thiazole, 2-amino-4-phenyl-5-cyano-thiazole, 2-amino-4-phenyl-5-n-butylsulphonyl-thiazole, 3-amino-isothiazole, 3-amino-5-nitro-isothiazole, 3-amino-4,5-dimethyl-isothiazole, 3-amino-5-phenyl-isothiazole, 5-amino-3-methyl-isothiazole, 5-amino-3,4-dimethyl-isothiazole, 5-amino-3-phenyl-isothiazole, 5-amino-3-methyl-4-cyano-isothiazole, 5-amino-3-phenyl-4-methyl-isothiazole, 5-amino-3-methyl-4-carbomethoxy-isothiazole, 5-amino-4-methyl-isothiazole, 5-amino-4-carbomethoxy-isothiazole, 3-amino-indazole, 3-amino-4-, 5- or 6-methyl-idazole, 3-amino-4-, 5- or 6-methoxy-indazole, 3-amino-4-, 5- or 6-chloro(bromo)-indazole, 3-amino-5- or 6-sulphonamido-indazole, -3-amino-5-N,N-dimethylaminosulphonindazole, 3-amino-5-pyrrolidyl-sulphonindazole, 3-amino-5- or 6-nitro-indazole, 3-amino-5- or 6-trifluoromethyl-indazole, 3-amino-6-cyano-indazole, 3-amino-5-methylsulphonyl-indazole, 3-amino-5-acetylamino-indazole, 1-methyl-, 1-isopropyl, 1-β-cyanoethyl- or 1-β-hydroxyethyl-3-amino-5-nitro-indazole, 6-amino-indazole, 1-methyl-6-amino-indazole, 3-amino-2-(4'-hydroxyphenyl)indazole, 3-amino-2-(4'-hydroxyphenyl)-6-methoxy-indazole, 3-amino-1,2,4-triazole, 3-amino-5-methyl (ethyl)-1,2,4-triazole, 3-amino-5-cyclohexyl-1,2,4-triazole, 3-amino-5-phenyl-1,2,4-triazole, 3-amino-5-(3'-methylphenyl)-1,2,4,-triazole, 3-amino-5-(4'-nitrophenyl)-1,2,4-triazole, 3-amino-5-(2'-thienyl)-1,2,4-triazole, 3-amino-1,2,4-triazole-5-carboxylic acid, 3-amino-5-benzyl-1,2,4-triazole, 3,5-diamino-1,2,4-triazole, 1-phenyl-3,5-diamino-1,2,4-triazole, 3-(2'-aminophenyl)-1,2,4-triazole, 3-amino-1-phenyl(naphthyl)-5-imino-4,5-dihydro-1,2,4-triazole, 3-amino-1-(4'-methylphenyl)-5-imino-4,5-dihydro-1,2,4-triazole, 3-amino-1-(4'-nitrophenyl)-5-imino-4,5-dihydro-1,2,4-triazole, 3-amino-1-(4'-methoxyphenyl)-5-imino-4,5-dihydro-1,2,4-triazole, 1-substituted-3-amino-1,2,4-triazoles such as, for example, 1-methyl-3-amino-1,2,4-triazole, 1-benzyl-3-amino-1,2,4-triazole, 1-phenyl-3-amino-1,2,4-triazole, 1-benzyl-5-methyl-3-amino-1,2,4-triazole, 1,5-dibenzyl-3-amino-1,2,4-triazole, 1-ethyl-5-phenyl-3-amino-1,2,4triazole, 4-phenyl-5-amino-pyrazole, 4-methyl-5-amino-pyrazole, 4-cyano-5-amino-pyrazole, 4-nitro-5-amino-pyrazole, 5-aminopyrazole-4-carboxylic acid amide, 3-aminopyrazole, 1-phenyl-3-amino-pyrazole, 3-amino-4-cyano-pyrazole, 3-amino-4-nitro-pyrazole, 3-amino-4-ethyl-pyrazole, 3-amino-4-ethoxycarbonyl-pyrazole, 3-amino-2-phenyl-4-methoxy-carbonyl-pyrazole, 1,4-diphenyl(dimethyl)-5-amino-pyrazole, 1-ethyl-4-methyl-5-amino-pyrazole, 1-n-butyl-4-methyl-5-amino-pyrazole, 1-isobutyl-4-methyl-5-amino-pyrazole, 1-benzyl-4-methyl-5-amino-pyrazole, 1-methyl-4-cyano-5-amino-pyrazole, 1-β-cyanoethyl-4-phenyl-5-amino-pyrazole, 1-β-hydroxyethyl-4-cyano-5-amino-pyrazole, 1-(2'-furfuryl)4-methyl-5-amino-pyrazole, 1-phenyl-4-cyano-5-amino-pyrazole, 1-phenyl-4-nitro-5-amino-pyrazole, 1-(4'-nitrophenyl)-4-cyano-5-amino-pyrazole, 1-(4'-methylphenyl)-4-cyano-5-amino-pyrazole, 1-phenyl-4-carbomethoy(ethoxy)-5-amino-pyrazole, 1-methyl-4-carbomethoxy-5-amino-pyrazole, 1-phenylsulphonyl-4-carbomethoxy-5-amino-pyrazole, 1-phenyl-5-amino-4-pyrazole-carboxylic acid amide, 1-phenylsulphonyl-4-cyano-5-amino-pyrazole, 1-phenyl-5-amino-4-pyrazole-carboxylic acid isopropyl ester, 5-amino-4-carbomethoxy-pyrazole, 5-amino-4-pyrazole-carboxylic acid isopropyl ester, 1-(3'-methylphenyl)-3-methyl-5-amino-pyrazole, 1-(4'-methylphenyl)-3-methyl-5-amino-pyrazole, 1-(3'-chlorophenyl)-3-methyl-5-amino-pyrazole, 1-(3'-methoxyphenyl)-3-methyl-5-amino-pyrazole, 1-(3'-methylsulphonylphenyl)-3-methyl-5-amino-pyrazole, 1-(4'-nitrophenyl)-3-methyl-5-amino-pyrazole, 3(5)-phenyl-5(3)-amino-pyrazole, 3(5)-(4'-methoxyphenyl)-5(3)-amino-pyrazole, 1-cyclohexyl-3-methyl-5-amino-pyrazole, 1,3-dimethyl(diphenyl)-5-amino-pyrazole, 1-ethyl-3-methyl-5-amino pyrazole, 1-(β-cyanoethyl)-3-methyl-5-amino-pyrazole, 1-(β-hydroxyethyl)-3-methyl-5-amino-pyrazole, 1-(β-methoxyethyl)-3-methyl-5-amino-pyrazole, 1-iso-propyl-3-methyl-5-amino-pyrazole, 1-phenyl-3-carbamyl-5-amino-pyrazole, 3,4-dimethyl-5-amino-pyrazole, 3-methyl-4-phenyl-5-amino-pyrazole, 3,4-trimethylene-5-amino-pyrazole, 3,4-tetramethylene-5-amino-pyrazole, 2,4-diphenyl-5-amino-pyrazole, 1-phenyl-3,4-dimethyl-5-amino-pyrazole, 1-phenyl-3-methyl-4-phenyl-5-amino-pyrazole, 1-phenyl-3-ethyl-4-methyl-5-amino-pyrazole, 1-phenyl-3,4-trimethylene-5-aminopyrazole, 1-phenyl-3,4-tetramethylene-5-amino-pyrazole, 1-(4'-methoxyphenyl)-3,4-dimethyl-5-amino-pyrazole, 1-phenyl-(3',-4':3,4)-thiopheno-5-amino-pyrazole, 1-methyl-3,4-dicyano-5-amino-pyrazole, 1-(β-hydroxyethyl)-3,4-trimethylene-5-amino-pyrazole, 1-(β-cyanoethyl)-3,4-dimethyl-5-amino-pyrazole, 1-(3'-thiacyclopentyl-3', 3'-dioxide)-3,4-dimethyl-5-amino-pyrazole, 1-(2'-benzthiazolyl)-3,4-dimethyl-5-amino-pyrazole, 1-phenylsulphonyl-3,4-dicyano-5-amino-pyrazole, 5- aminotetrazole, 5-(2'-aminophenyl)-tetrazole, 2-amino-1,3,4-oxdiazole, 2-amino-imidazole, 2-amino-4-methyl-imidazole, 2-amino-5-methyl-imidazole, 2-amino-4,5-dimethyl-imidazole, 2-amino-4,5-diphenyl-imidazole, 2-amino-4-methyl-5-phenylimidazole, 2-amino-benzimidazole, 2-amino-5-methyl-benzimidazole, 2-amino-6-methylsulphonyl-benzimidazole, 2-amino-6-chloro-benzimidazole, 2-(2'-aminophenyl)-benzimidazole, 2-amino-pyridine, 2-amino-6-methyl-pyridine, 2-amino-4-methyl-pyridine, 2-amino-5-chloro-pyridine, 2-amino-5-ethoxy-pyridine, 2-amino-8-ethoxy-quinoline, 2-amino-quinoline, 4-amino-quinoline, 4-amino-quinaldine, 1-aminoisoquinoline, 4-amino-pyridine, 5-chloro-7-amino-benzimidazole, 4-amino-2- or 3-methyl-pyridine, 4-aminoisoquinoline, 3-amino-pyridazine, 2-amino-pyrazine, 5-amino-isoxazole, 5-amino-3,4-dimethylisoxazole, 3-amino-isoxazole, 2-amino-selenazole, 5-aminoisoselenazole, 2-amino-1,3,4-thiadiazole, 2-amino-5-methyl1,3,4-thiadiazole, 2-amino-5-phenyl-1,3,4-thiadiazole, 2-amino-5-methoxy-1,3,4-thiadiazole, 2-amino-5-methylmercapto-1,3,4-thiadiazole, 2-amino-5-(ethoxycarbonylmethylthio)-1,3,4-thiadiazole, 2-amino-5-methylsulphonyl-1,3,4-thiadiazole, 5-amino-1,2,4-thiadiazole, 5-amino-3-methyl-1,2,4-thiadiazole, 5-amino-3-phenyl-1,2,4-thiadiazole, 5-amino-3-chloro-1,2,4-thiadiazole, 5-amino-3-methoxy(ethoxy)-1,2,4-thiadiazole, 5-amino-3-benzyloxy-1,2,4-thiadiazole, 5-amino-3-methylmercapto-1,2,4-thiadiazole and 5-amino-3-methyl-1,2,4-oxadiazole.

The following are examples of compounds which can be used, within the scope of the present invention, as suitable vinylheterocyclic compounds are β-hydroxyethylheterocyclic compounds of the formula XI or XII respectively: 2-vinylpyridine, 2-β-hydroxyethylpyridine, 2-vinyl-5-ethylpyridine, 2-β-hydroxyethyl-5-ethylpyridine, 2-vinyl-5-methylpyridine, 2-β-hydroxyethyl-5-methylpyridine, 2-vinyl-4,6-dimethylpyridine, 2-β-hydroxyethyl-4,6-dimethylpyridine, 2-vinyl-6-methylpyridine, 2-β-hydroxyethyl-6-methylpyridine, 2-vinyl-3,5-dimethoxymethylpyridine, 2-isopropylpyridine, 2-vinylimidazole, 2-β-hydroxyethylimidazole, 2-vinyl-1-methylimidazole, 2-β-hydroxyethyl-1-methylimidazole, 2-vinylbenzimidazole, 2-β-hydroxyethylbenzimidazole, 2-vinyl-1-methyl-benzimidazole, 2-β-hydroxyethyl-1-methyl-benzimidazole, 4-vinylimidazole, 5-vinylimidazole, 2-vinylthiazole, 2-β-hydroxyethylthiazole, 2-vinyl-4-methylthiazole, 2-β-hydroxyethyl-4-methylthiazole, 2-vinyl-4-phenylthiazole, 2-β-hydroxyethyl-4-phenylthiazole, 2-vinyl-4,5-dimethylthiazole, 2-β-hydroxyethyl-4,5-dimethylthiazole, 2-vinylbenzthiazole, 2-β-hydroxyethyl-benzthiazole, 2-vinylquinoline, 2-β-hydroxyethyl-quinoline, 4-vinylpyrimidine, 2-N,N-dimethylamino-4-vinylpyrimidine, 4-vinylpyridine and 4-vinylquinoline.

Examples of possible components BH are: 1-phenyl-3-methyl- or 1-phenyl-3-methoxy-5-aminopyrazole, 1-methyl-, 1-isopropyl- or 1-butyl-3-methyl-5-aminopyrazole, 1-β-cyanoethyl- or 1-β-hydroxyethyl-3-methyl-5aminopyrazole, 1-cyclohexyl-, 1-p-tolyl-1-p-methoxyphenyl-3-methyl-5-aminopyrazole or 1-o-, -m- or -p-chloro or -bromo-phenyl-3-methyl-5-aminopyrazole, 1-benzyl-3-methyl-5-aminopyrazole or 3-methyl-5-amino-pyrazole, 1,3-dimethyl-2-cyanomethylenebenzimidazoline, 1,3,5-trimethyl-2-cyanomethylenebenzimidazoline, 1,3-dimethyl-5-methoxy-2-cyanomethylenebenzimidazoline, 1,3-dimethyl-5-acetylamino-2-cyanomethylenebenzimidazoline, 1,3-diethyl-5-ethoxy-2-cyanobenzimidazoline, 1,3-dimethylbenzimidazolinylidene-2-acetic acid amide, 1,3-dimethylbenzimidazolinylidene-2-acetic acid, 1,3,3-trimethyl-2-cyanomethyleneindoline, 5-chloro-1,3,3-trimethyl-2-cyanomethylene-indoline, 3-methyl-2-cyanomethylenebenzthiazoline, 1-methyl-4-cyanomethylenedihydro-pyridine, 1-amino-2-methyl-benzene, 1-amino-3-methyl-benzene, 1-amino-2-methoxy-5-methyl-benzene, 1-amino-2,5-dimethoxy-benzene, N-ethyl-amino-benzene, N,N-diethylaminobenzene, N-methyl-N-benzylamino-benzene, N-ethyl-N-benzylaminobenzene, N-ethyl-N-benzyamino-3-methyl-benzene, N,N-dibenzylamino-benzene, 1-N-2'-hydroxyethylamino-3-methyl-benzene, N,N-bis-2'-hydroxyethylamino-benzene, N-methyl-N-2'-cyanoethylaminobenzene, N,N-bis-2'-cyanoethylamino-benzene, N,N-bis-2'-acetoxyethylaminobenzene, N,N-bis-2'-methoxyethylamino-benzene, N-methyl-N-2'-hydroxyethylamino-benzene, N-butyl-N-2'-hydroxyethylaminobenzene, N-2'-cyanoethyl-N2'-hydroxyethylaminobenzene, N-ethyl-N-2'-acetoxyethylaminobenzene, N-ethyl-N-2'-hydroxyethylamino-3-methyl-benzene, N-ethyl-N-2'-acetoxyethylamino-3-methyl-benzene, N-ethyl-N-2'-acetoxyethylamino-2-methyl-benzene, 1-N,N-diethylamino-2,5-dimethoxybenzene, 1-N,N-diethylamino-2-methoxy-5-methyl-benzene, N-methyl(ethyl)-diphenylamine, N-methyl-4-ethoxy-diphenylamine, 1-N,N-diethylamino-3-N-acetylamino-benzene, 1-N,N-dimethylamino-3-ethoxy-benzene, 2-amino-1,4-dimethoxy-benzene, N-methyl-N-2'-acetoxyethylamino-benzene, N-2'-acetoxyethylamino-benzene, N-2'-hydroxyethyl-N-2'-acetoxyethylaminobenzene, 1-N,N-bis-(2'-acetoxyethylamino)-3-methyl-benzene, 1-N,N-bis-(2'-acetoxyethylamino)-2-methoxy-5-methyl-benzene, 1-N-(2'-dimethylaminoethyl)-amino-benzene, 1-N-(2'-dimethylaminoethyl)-amino-3-methyl-benzene, 1-N-(2'-dimethylaminoethyl)-N-ethyl-amino-3-methyl-benzene, 1-N-(2'-dimethylaminoethyl)-N-butylamino-benzene, 1-N-(2'-dimethylaminoethyl)-N-(2'-hydroxyethyl)-amino-benzene, N,N-dimethylamino-2-methyl-benzene, 1-N-(2'-dimethylaminoethyl)-N-ethyl-amino-2-methoxy-5-methyl-benzene, N,N-diethylamino-3-hydroxy-benzene, N,N-bis-(2'-hydroxyethyl)-amino-3-methyl-benzene, N,N-bis-(2'-cyanoethyl)-amino-3-methyl-benzene, N,N-bis-(2'-cyanoethyl)-amino-2-methoxy-5-methyl-benzene, N,N-dimethylamino-3-chloro-benzene, N,N-dimethylamino-3-nitro-benzene, N,N-diethylamino-3-nitro-benzene, N-butyl-N-2'-chloroethylaminobenzene, N-ethyl-N-2'-chloroethylamino-3-methyl-benzene, N-ethyl-N-2'-hydroethylamino-benzene, 1-N,N-bis-(2'-carboxyethyl)-amino-3-methyl-benzene, 1-N,N-bis-(2'-acetoxyethyl)-amino-2-ethoxy-5-acetylamino-benzene, 1-N-(2'-cyanoethyl)-amino-3-acetylamino-benzene, 1-N,N-bis-(2'-acetoxyethyl)-amino-3-methylsulphonyl-amino-benzene, 1-N,N-bis(2'-cyanoethyl)-amino-3-ethoxycarbonyloxy-amino-benzene, 1-N-(2'-cyanoethyl)-N-(2'-carbomethoxyethyl)-amino-3-acetylaminobenzene, 1-N,N-bis-(2'-carbomethoxyethyl)-amino-3-acetylaminobenzene, 1-N-(2'-methoxycarbonyloxyethyl)-amino-3-acetylaminobenzene, 1-N,N-bis(2'-methoxycarbonyloxyethyl)-amino-3-acetylamino-benzene, 1-N,N-dimethylamino-3-trifluoromethylbenzene, N,N-dimethylamino-3-methylsulphonyl-benzene, N,N-dimethylamino-3-dimethylsulphonic acid amide, N-ethyl-N-2'-phthalimidoethylamino-benzene, N-ethyl-N-2'-(pyridyl-4)-ethylamino-benzene, N-ethyl-N-2'-(pyridyl-2)- ethylamino-benzene, N-ethyl-N-2'-(pyridinium-1-chloride)-ethylamino-benzene, N-ethyl-N-2'-(diethyl-sulphonium chloride)-ethylamino-benzene, N-ethyl-N-2'-carboxyethylamino-3-methyl-benzene, 1-diethylaminonaphthalene, 1-N-ethyl-N-2'-cyanoethylamino-naphthalene, N-phenyl-N,N'-dimethylhydrazine, N,N'-diphenyl-N-methylhydrazine, acetophenone-methylphenylhydrazone, benzophenonemethylphenylhydrazone, N-phenylmorpholine, N-phenylpiperidine, N-phenylpyrrolidine, N-phenylpiperazine, N-m-tolyl-thiomorpholine-1,1-dioxide, N-m-methoxyphenyl-thiomorpholine-1,1-dioxide, N-2-methyl-5-methoxyphenyl-thiomorpholine-1,1-dioxide, N-2'-hydroxyethylbenzomorpholine, N-2',3'-n-dihydroxypropyl-5-acetylaminobenzomorpholine, 1,2,3,4-tetrahydroquinolines such as N-2'-cyanoethyl-tetrahydroquinoline, N-2'-hydroxyethyl-tetrahydroquinoline, N-2'-3'-n-dihydroxypropyl-7-methoxy-tetrahydroquinoline, N-2',3'-n-dihydroxypropyl-5-acetylamino-tetrahydroquinoline, N-2'-hydroxyethyl-2,2,4-trimethyl-tetrahydroquinoline, N-n-butyl- 3-hydroxy-7-methyltetrahydroquinoline, 3-hydroxy-7,8-benzo-tetrahydroquinoline, N-methyl(ethyl)-carbazole, N-n-propyl(butyl)-carbazole, N-iso-propyl(butyl)-carbazole, N-2'-hydroxyethyl-carbazole, N-2'-cyanoethyl-carbazole, N-2'-chloroethyl-carbazole, N-2'-acetoxyethyl-carbazole, N-2'-benzoyloxyethyl-carbazole, N-2'-methoxyethyl-carbazole, N-benzylcarbazole, N-ethyl-3-acetylamino-carbazole, lilolidine, julolidine, perimidine, 1-methyl-4-amino-benzimidazole, 1,2-dimethyl-indoline, 1,2,3,3-tetramethylindoline, 1-benzyl-2-methylindoline, 1-2'-chloroethyl-2-methylindoline, 1-2'-bromoethyl-2-methylindoline, 1-2'-hydroxyethyl-2-methylindoline, 1-butyl-2-methylindoline, 2-phenyl-indole, 2-phenyl-5-methyl(ethyl)-indole, 2-phenyl-5-chloro-indole, 2-phenyl-5-methoxy-indole, 2-phenyl-5-ethoxyindole, 2-phenyl-7-ethyl-indole, 2-phenyl-7-methoxy-indole, 2-phenyl-7-chloro-indole, 2-phenyl-6-chloro(bromo)-indole, 2-phenyl-5-fluoro-indole, 2-phenyl-5,7-dimethyl-indole, 2-phenyl-5,7-dichloro-indole, 2-phenyl-4-chloro-indole, 2-phenyl-6,7-benz-indole, 2-(2'-naphthyl)-indole, 2-(4'-biphenyl)-indole, 2-methyl-indole, 2-methyl-5-chloro(bromo)-indole, 2-methyl-5-fluoro-indole, 2-methyl-6-chloro-indole, 2-methyl-7-chloro-indole, 2,5-dimethyl-indole, 2,4-dimethyl-7-methoxy-indole, 2-methyl-5,7-dichloro-indole, 1-methyl-2-phenyl-indole, 1-(2'-cyanoethyl)-2-phenyl-indole, 1-(2'-carbonamidoethyl)-2-phenyl-indole, 1-(2'-carboxyethyl)-2-phenyl-indole, 1-(3'-aminopropyl)-2-phenyl-indole, 1-(3'-succinimidopropyl)-2-phenyl-indole, 1-(3'-phthalimidopropyl)-2-phenyl-indole, 1-methyl-2-(4'-chloro-phenyl)-indole, 1-methyl-2-(4'-methylphenyl)- or 1-methyl-2-(4'-methoxyphenyl)-indole, 1-ethyl-2-phenyl-indole, 1-n-propyl- or 1-iso-propyl-2-phenyl-indole, 1-n-butyl- or 1-iso-butyl-2-phenyl-indole, 1-benzyl-2-phenyl-indole, 1-phenyl-ethyl-2-phenyl-indole 1-(2'-chloroethyl)-2-phenyl-indole, 1-(2'-methoxyethyl)-2-phenyl-indole, 1-(2'-cyanoethyl)-2-methyl-indole, 1-(2'-carbonamidoethyl)-2-methyl-indole, 1-(2'-cyanoethyl)-2,6-dimethyl-indole and 1,2-dimethyl-indole.

The preparation, according to the invention, of the new dyestuffs by reaction of the azo compounds of the formula X with a heterocyclic vinyl compound of the formula XI or a β-hydroxyethylheteryl compound of the formula XII is carried out in the presence of Bronsted acids or Lewis acids.

Possible Brönsted acids are monobasic or polybasic organic or inorganic acids.

Strong or moderately strong Brönsted acids such as, for example, aqueous solutions of hydrogen chloride, of perchloric acid or of ortho-phosphoric acid are employed in equimolar amounts or preferably in less than equimolar amounts relative to the vinyl compound XI.

The weak or very weak Brönsted acids, the $pK_a$ values of which should be between 1 and 5, can even be added in excess, in which case the excess acid then advantageously simultaneously functions as the solvent.

The following should be mentioned as examples from the large number of weak or very weak Brönsted acids to be considered:

Saturated aliphatic monocarboxylic acids such as formic acid, acetic acid, propionic acid, valeric acid and caproic acid and, amongst saturated aliphatic dicarboxylic acids and polycarboxylic acids, for example oxalic acid, malonic acid, succinic acid, glutaric acid and tricarballylic acid. Amongst the cycloaliphatic saturated acids, cyclohexanecarboxylic acid should be mentioned. Amongst the group of the carbocyclic-aromatic acids, benzoic acid and phthalic acid may be mentioned as examples.

The organic acids mentioned can be substituted so that their $pK_a$ values lie between 1 and 5.

Examples of acids substituted in this way, from the aliphatic and carbocyclic-aromatic series are: monochloroacetic acid, dichloroacetic acid, glycollic acid, nitroacetic acid, cyanoacetic acid, acetoacetic acid, lactic acid, pyruvic acid, tartaric acid, citric acid, tartronic acid, α-chloropropionic acid, β-chloropropionic acid, o-nitrobenzoic acid, p-nitrobenzoic acid and salicylic acid.

If the reaction is carried out with Lewis acids, these are added in equimolar amounts or less, relative to the heterocyclic vinyl compound of the formula III. Examples of Lewis acids which can be used are aluminium chloride, boron trifluoride, zinc chloride or tin tetrachloride. Possible solvents or diluents are those which are customary in Friedel-Crafts reactions and these can appropriately be recovered by distilling them off.

The molar ratio of the azo compound to the heterocyclic vinyl compound or the β-hydroxyethyl compound can vary between 1:1 and 1:6, and if there is an excess of vinyl compound several quaternisable or reactive atoms can also react, if they are present in the azo compound.

The temperature range for the reaction extends from room temperature to 120° C and preferably from 60° to 100° C, and it is advantageous if the boiling point of a solvent corresponds to the reaction temperature.

The new dyestuffs are suitable for dyeing and printing materials of leather, tannin-treated cotton, cellulose, synthetic high molecular polyamides and high molecular polyurethanes, and fibres containing lignin. They are furthermore suitable for the manufacture of writing fluids, rubberstamp inks and ball pen pastes, and can also be used in flexographic printing.

In particular, however, the dyestuffs according to the invention are suitable for dyeing — from an aqueous liquor or from organic solvents — and printing filaments, tapes, woven fabrics or knitted fabrics of polyacrylonitrile or of copolymers of acrylonitrile with other vinyl compounds such as vinyl chloride, vinylidene chloride, vinyl fluoride, vinyl acetate, vinylpyridine, vinylimidazole, vinyl alcohol, acrylic acid esters and amides and methacrylic acid esters and amides and asymmetrical dicyanoethylene, or flocks, fibres, filaments, tapes, woven fabrics or knitted fabrics of acid-modified polyamide fibres. Examples of acid-modified aromatic polyesters are polycondensation products of sulphoterephthalic acid and ethylene glycol, that is to say polyethylene glycol terephthalates containing sulphonic acid groups (Type DACRON 64 of E. I. DuPont de Nemours and Company), such as are described in Belgian Pat. Specification No. 549,179 and U.S. Pat. No. 2,893,816.

The examples which follow serve to explain the invention further. Parts are relative to weight.

EXAMPLE 1

7.8 parts of the azo compound of the following formula

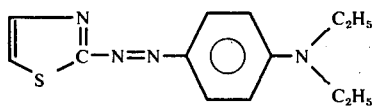

are dissolved in 36 parts of formic acid at 50° C, 9.45 parts of 2-vinylpyridine are added and the reaction solution is heated for 5 hours at 80° C, whilst stirring.

The dyestuff of the formula shown below is obtained by pouring the mixture out into 200 parts of warm water, boiling up with 3 parts of charcoal, filtering and precipitation with 40 parts of zinc chloride, the amount obtained being 14.7 parts after drying.

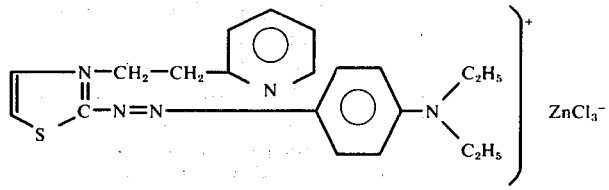

A sample of recrystallised from methanol gave the following analytical data:

$C_{20}H_{24}N_5S \cdot ZnCl_3$ (538.3)

| | | | |
|---|---|---|---|
| Calculated. | C 44.63 | H 4.49 | N 13.01 |
| Found. | 44.50 | 4.65 | 12.95 |

This dyestuff dyes polyacrylonitrile materials, acid-modified polyester fabrics and acid-modified polyamide fabrics in a clear blue colour shade. The dyeings are distinguished by their good general fastness properties.

Further valuable dyestuffs of similar structure, as listed in the form of a table below, can be obtained following an analogous procedure.

| Example No. | Structure of the dyestuff | Colour shade on polyacrylonitrile fibres |
|---|---|---|
| 2 | | Blue |
| 3 | | Blue |
| 4 | | Blue |

-continued
| Example No. | Structure of the dyestuff | Colour-shade on polyacrylonitrile fibres |
|---|---|---|
| 5 | 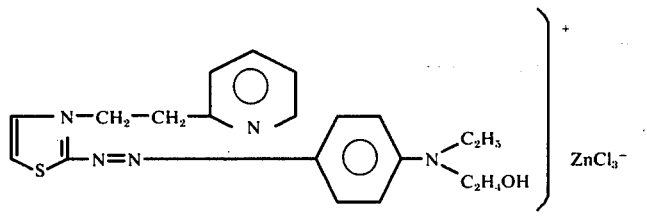 | Blue |
| 6 | 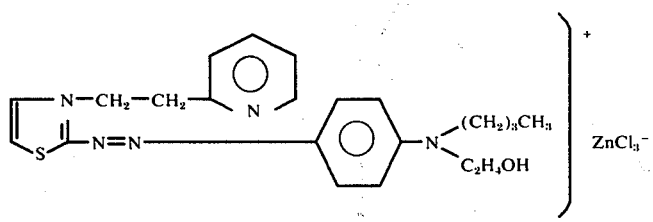 | Blue |
| 7 | 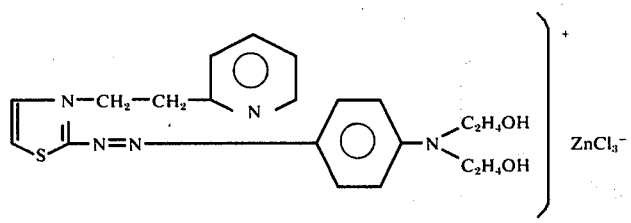 | Blue |
| 8 | 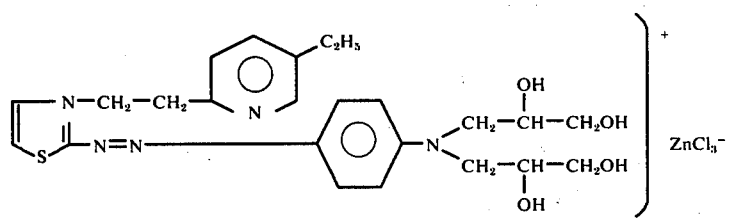 | Blue |
| 9 | 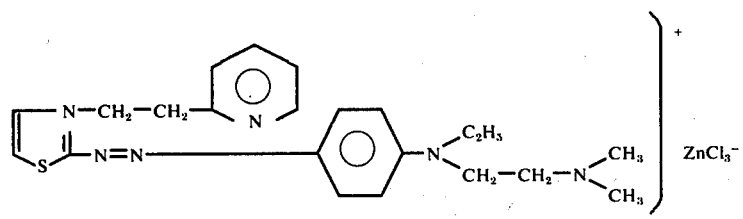 | Blue |
| 10 | 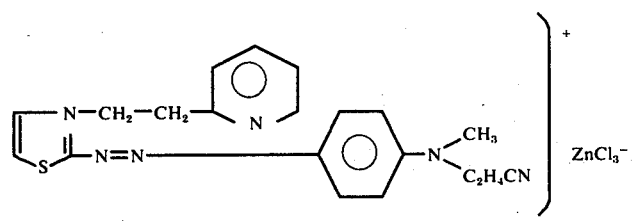 | Blue |
| 11 | 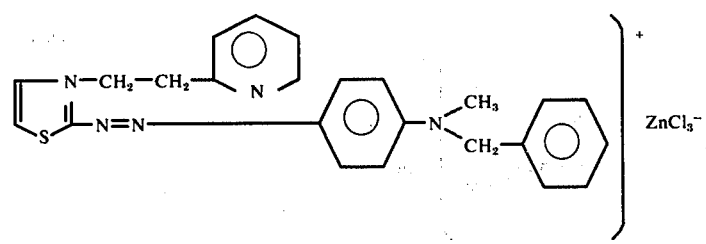 | Blue |

| Example No. | Structure of the dyestuff | Colour shade on polyacrylonitrile fibres |
|---|---|---|
| 12 | | Blue |
| 13 | | Blue |
| 14 | | Greenish-tinged blue |
| 15 | | Greenish-tinged blue |
| 16 | | Greenish-tinged blue |
| 17 | (n = 0,1) | Greenish-tinged blue |
| 18 | | Violet |

-continued
| Example No. | Structure of the dyestuff | Colour shade on polyacrylonitrile fibres |
|---|---|---|
| 19 | 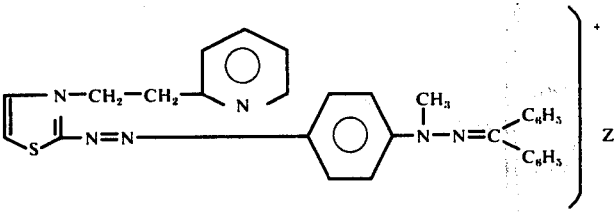 | Violet |
| 20 | 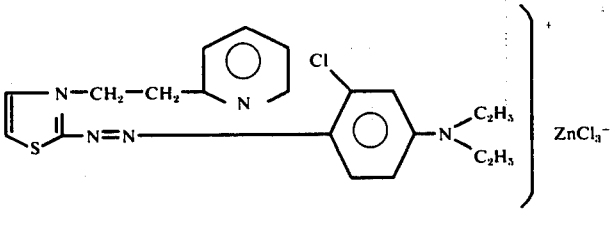 | Reddish-tinged blue |
| 21 | 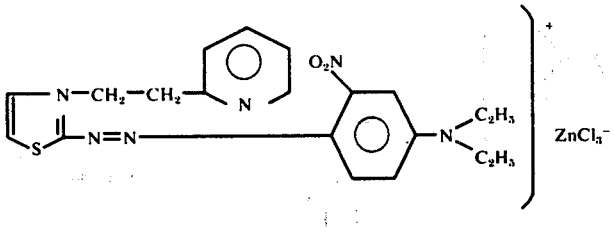 | Blue |
| 22 | 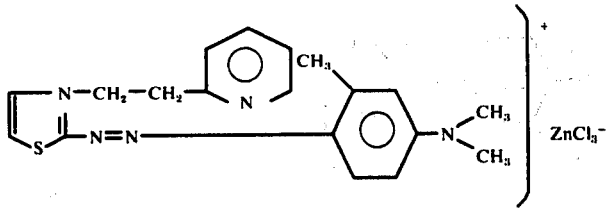 | Reddish-tinged blue |
| 23 | 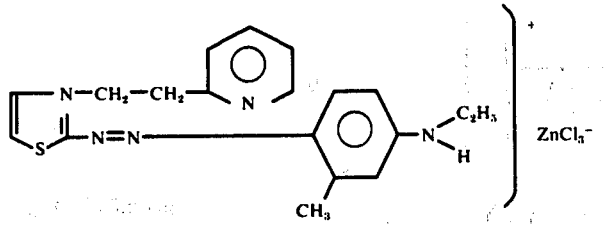 | Violet |
| 24 | 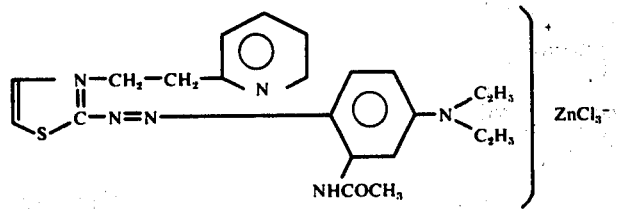 | Reddish-tinged blue |
| 25 | 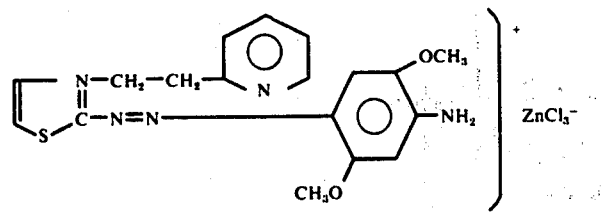 | Violet |

-continued
| Example No. | Structure of the dyestuff | Colour shade on polyacrylonitrile fibres |
|---|---|---|
| 26 | 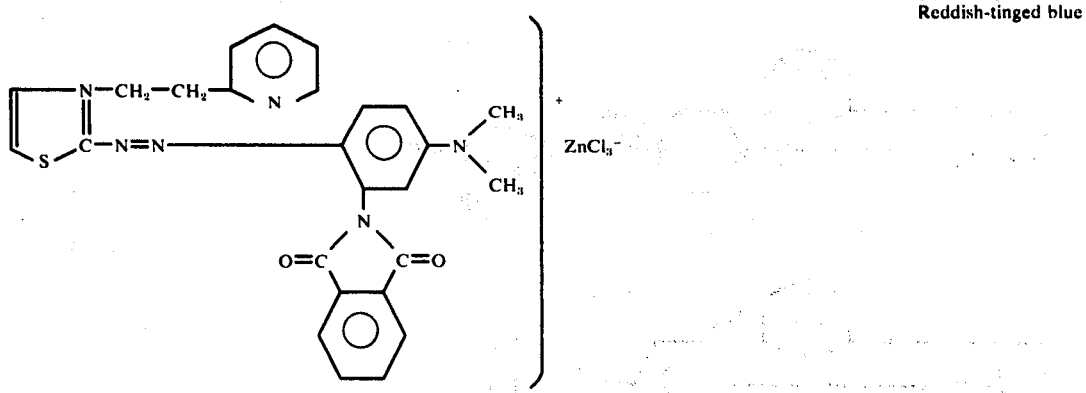 | Reddish-tinged blue |
| 27 | 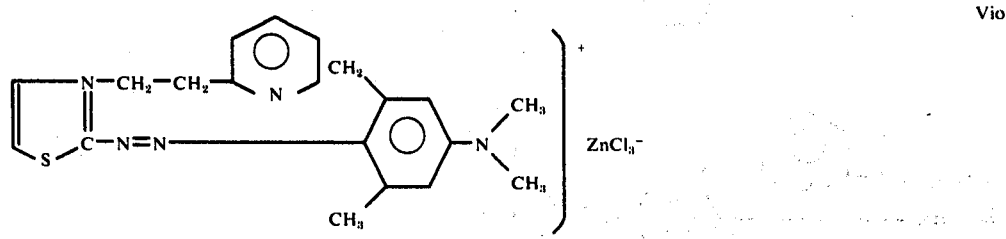 | Violet |
| 28 | 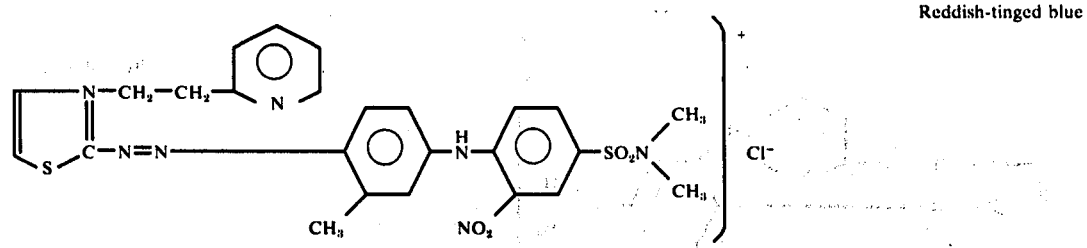 | Reddish-tinged blue |
| 29 | 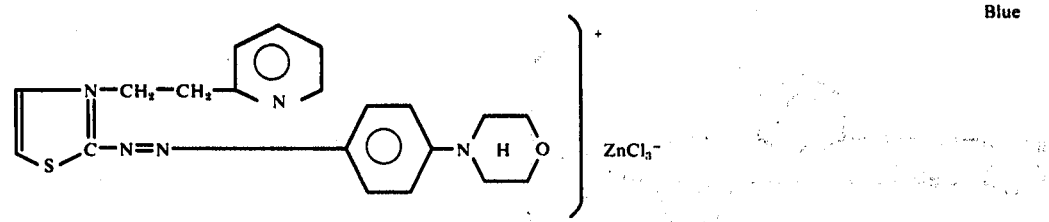 | Blue |
| 30 | 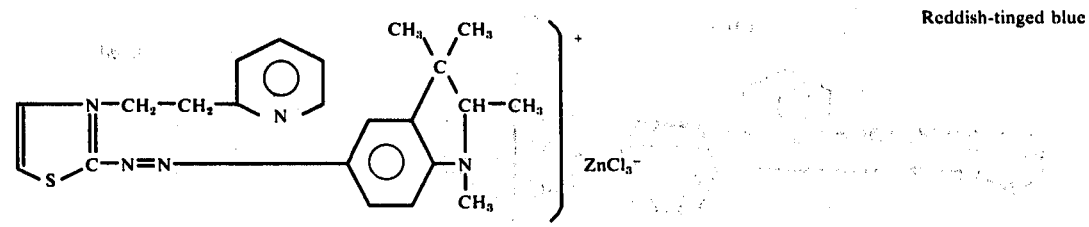 | Reddish-tinged blue |
| 31 | 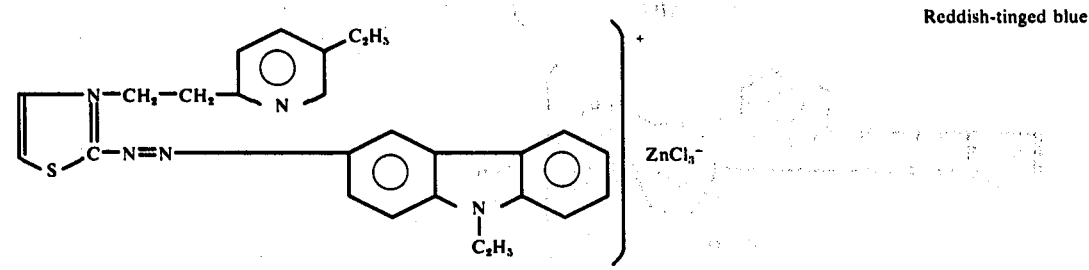 | Reddish-tinged blue |

| Example No. | Structure of the dyestuff | Colour shade on polyacrylonitrile fibres |
|---|---|---|
| 32 | 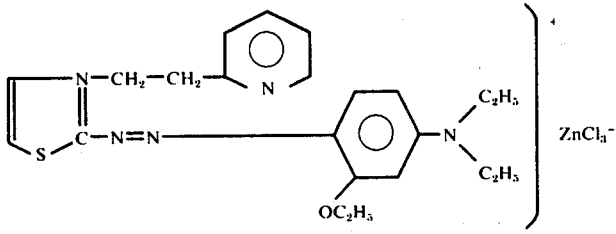 | Violet |
| 33 | 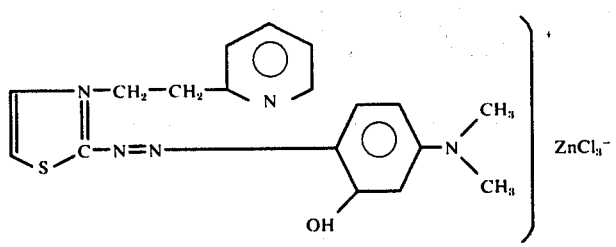 | Red-violet |
| 34 | 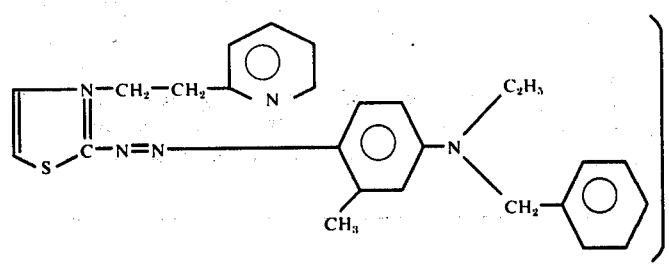 | Reddish-tinged blue |
| 35 | 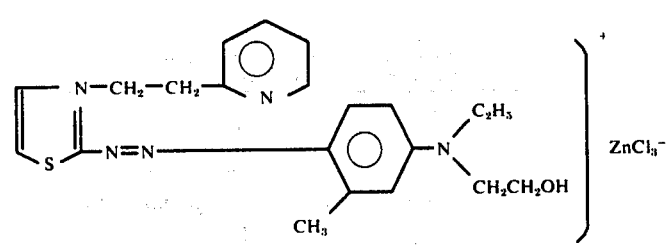 | Blue |
| 36 | 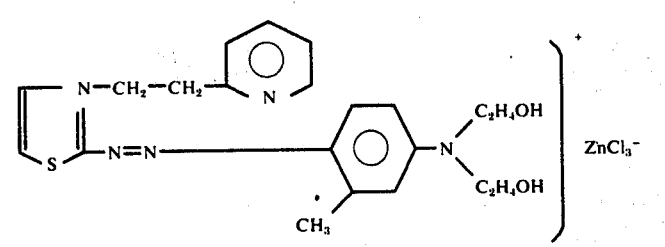 | Blue |
| 37 | 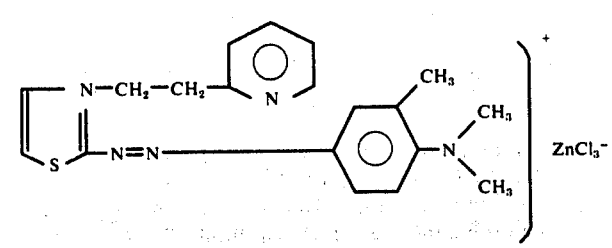 | Blue |

| Example No. | Structure of the dyestuff | Colour shade on polyacrylonitrile fibres |
|---|---|---|
| 38 | 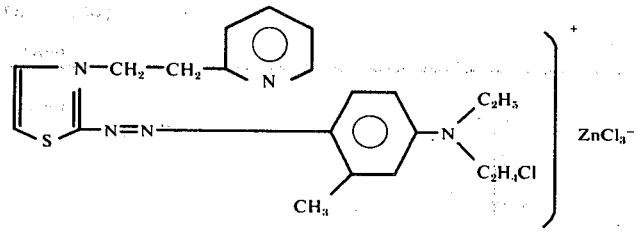 | Reddish-tinged blue |
| 39 | 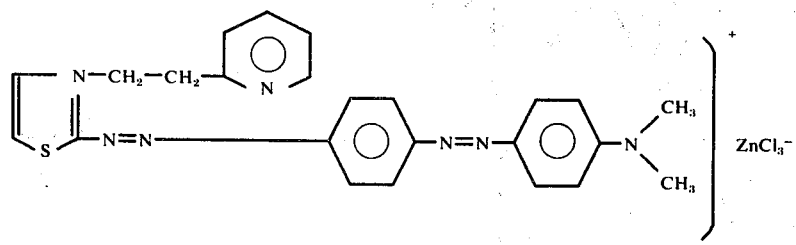 | Reddish-tinged blue |

EXAMPLE 40

A dyestuff which in respect of the dyestuff cation is identical to that of Example 1 is also obtained if the following Bronsted acids or Lewis acids and solvent systems are employed, in the ratios indicated. The reactants were in each case stirred for 5 hours in the temperature range of 60°–85° C and the reaction mixtures were worked up by pouring out into water or distilling off the solvent and taking up the residue in water.

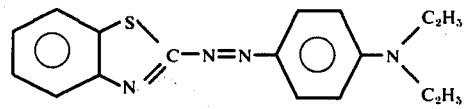

in 36 parts of formic acid is treated with 9.45 parts of 2-vinylpyridine at 50° C and the mixture is stirred for a further 5 hours at 80° C. After pouring out the reaction Parts of azo compound of the formula

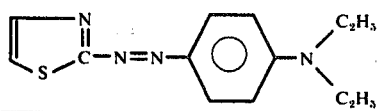

| | Bronsted/Lewis acid | Parts of Bronsted/ Lewis acid | Parts of 2-vinyl-pyridine | Additional solvents parts | |
|---|---|---|---|---|---|
| 7.8 | acetic acid | 30 | 9.45 | none | |
| 7.8 | propionic acid | 30 | 6.3 | none | |
| 7.8 | butyric acid | 30 | 6.3 | none | |
| 7.8 | valeric acid | 30 | 6.3 | none | |
| 7.8 | caproic acid | 30 | 6.3 | none | |
| 7.8 | oxalic acid | 30 | 6.3 | 56 | methyl ethyl ketone |
| 7.8 | malonic acid | 30 | 6.3 | 64 | '' |
| 7.8 | succinic acid | 35.4 | 6.3 | 130 17 | isopropanol + water |
| 7.8 | glutaric acid | 39.6 | 6.3 | 150 17 | isopropanol + water |
| 7.8 | aluminium chloride | 6.67 | 6.3 | 60 | nitrobenzene |
| 7.8 | phosphorus oxychloride | 9.2 | 6.3 | 32 | methyl ethyl ketone |
| 2.6 | aqueous hydrochloric acid (37% strength) | 0.99 | 1.05 | 16 | '' |
| 7.8 | aqueous hydrochloric acid (37% strength) | 5.92 | 6.3 | 48 | '' |
| 7.8 | o-phosphoric acid (85% strength) | 3.46 | 6.3 | 48 | '' |
| 7.8 | aqueous perchloric acid (70% strength) | 8.6 | 6.3 | 64 | '' |
| 7.8 | p-toluenesulphonic acid H$_2$O | 11.4 | 6.3 | 48 | '' |
| 7.8 | benzoic acid | 36.6 | 9.45 | 40 | '' |
| 7.8 | phenylacetic acid | 40.8 | 6.3 | 24 | '' |
| 2.6 | o-nitrobenzenoic acid | 16.7 | 2.1 | 24 | '' |
| 2.6 | salicylic acid | 13.8 | 2.1 | 28 | '' |

EXAMPLE 41

A solution of 9.3 parts of the azo compound of the formula solution into 200 parts of warm water, adding 3 parts of charcoal, boiling and filtering, the dyestuff is precipitated in a crystalline form by means of 15 parts of zinc chloride, and after drying in vacuo 12 parts of product are obtained. After boiling with 400 parts of water, the dyestuff of the formula

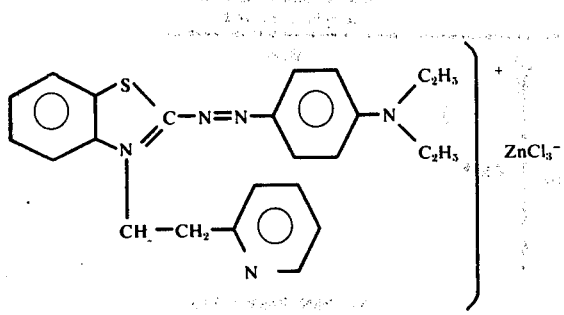

is obtained in a pure state according to thin layer chromatography.

The dyestuff dyes polyacrylonitrile materials, acid-modified polyester fabrics and acid-modified polyamide fabrics in a clear ultramarine-blue colour shade. The dyeings have excellent fastness to light and to decatising. Further valuable dyestuffs of similar structure can be obtained on following an analogous procedure. The structures of these dyestuffs are given below:

| Example No. | Structure of the dyestuff | Colour shade on polyacrylonitrile fibres |
|---|---|---|
| 42 | | Blue |
| 43 | | Blue |
| 44 | | Blue |
| 45 | | Blue |
| 46 | | Blue |

| Example No. | Structure of the dyestuff | Colour shade on polyacrylonitrile fibres |
|---|---|---|
| 47 | 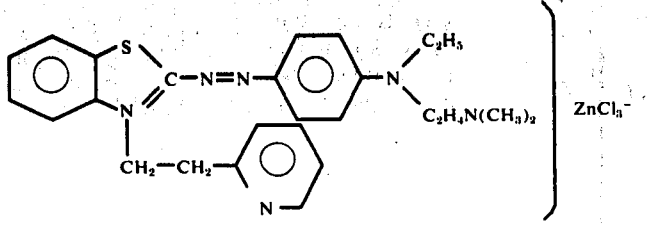 ZnCl$_3^-$ | Blue |
| 48 | 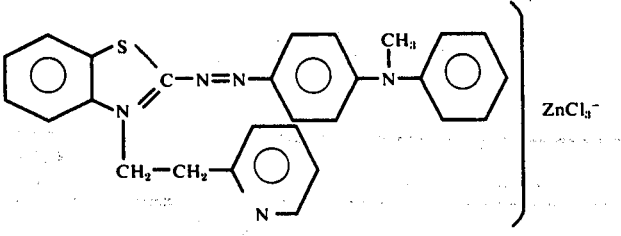 ZnCl$_3^-$ | Greenish-tinged blue |
| 49 | 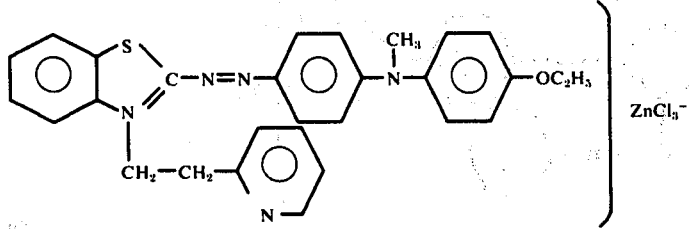 ZnCl$_3^-$ | Greenish-tinged blue |
| 50 | 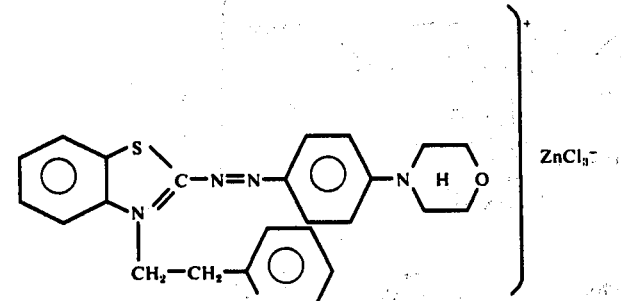 ZnCl$_3^-$ | Blue |
| 51 | 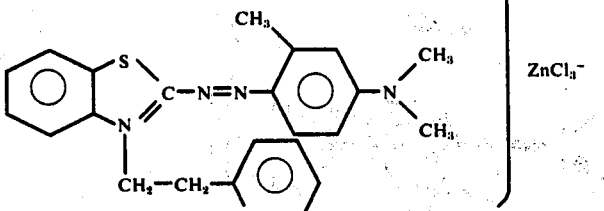 ZnCl$_3^-$ | Reddish-tinged blue |
| 52 | 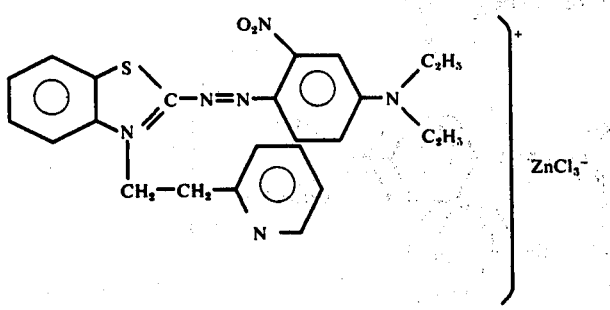 ZnCl$_3^-$ | Greenish-tinged blue |

-continued
| Example No. | Structure of the dyestuff | Colour shade on polyacrylonitrile fibres |
|---|---|---|
| 53 | 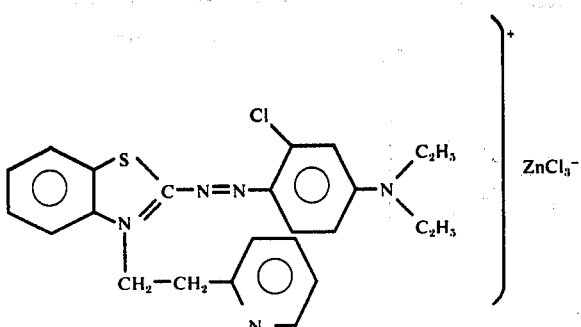 ZnCl₃⁻ | Blue |
| 54 | 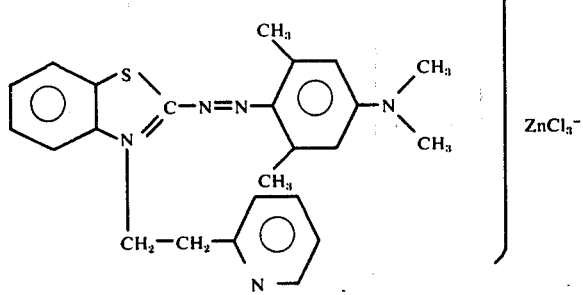 ZnCl₃⁻ | Violet |
| 55 | 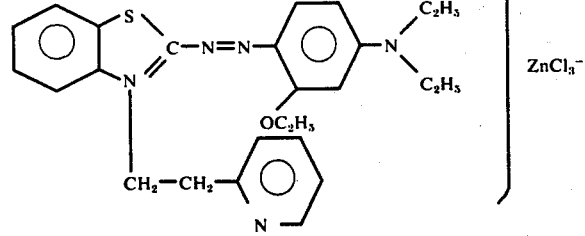 ZnCl₃⁻ | Violet |
| 56 | 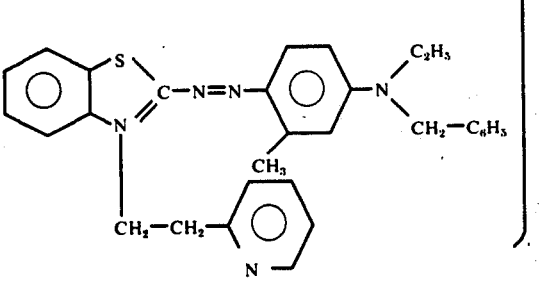 ZnCl₃⁻ | Blue |
| 57 | 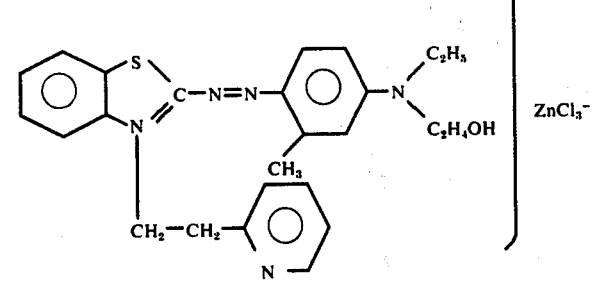 ZnCl₃⁻ | Blue |

-continued

| Example No. | Structure of the dyestuff | Colour shade on polyacrylonitrile fibres |
|---|---|---|
| 58 | [benzothiazole-C(=N-CH₂-CH₂-pyridyl)-N=N-phenyl(CH₃)-N(C₂H₅)(C₂H₄Cl)]⁺ ZnCl₃⁻ | Blue |
| 59 | [benzothiazole-C(=N-CH₂-CH₂-pyridyl)-N=N-carbazole(N-C₂H₅)]⁺ ZnCl₃⁻ | Blue |
| 60 | [benzothiazole-C(=N-CH₂-CH₂-pyridyl)-N=N-phenyl(C(CH₃)₃)-N(CH(CH₃)(phenyl))(CH₃)]⁺ ZnCl₃⁻ | Blue |
| 61 | [C₂H₅O-benzothiazole-C(=N-CH₂-CH₂-pyridyl)-N=N-phenyl(NO₂)-N(C₂H₅)₂]⁺ ZnCl₃⁻ | Greenish-tinged blue |
| 62 | [benzothiazole-C(=N-CH₂-CH₂-pyridyl)-N=N-phenyl-N(C₂H₅)₂]⁺ ZnCl₃⁻ | Blue |

-continued
| Example No. | Structure of the dyestuff | Colour shade on polyacrylonitrile fibres |
|---|---|---|
| 63 | 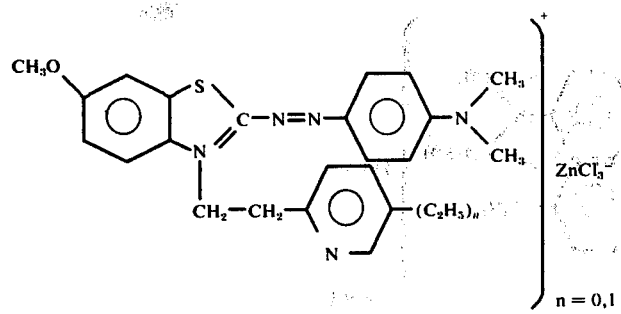 | Blue |
| 64 | 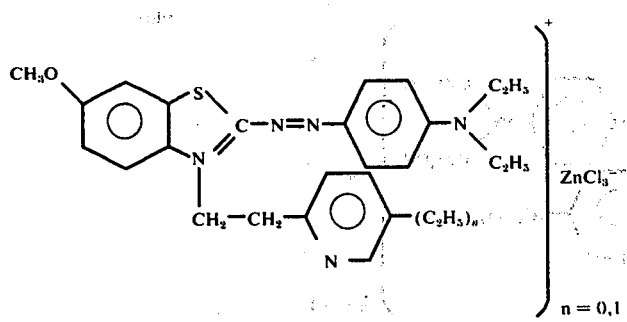 | Blue |
| 65 | 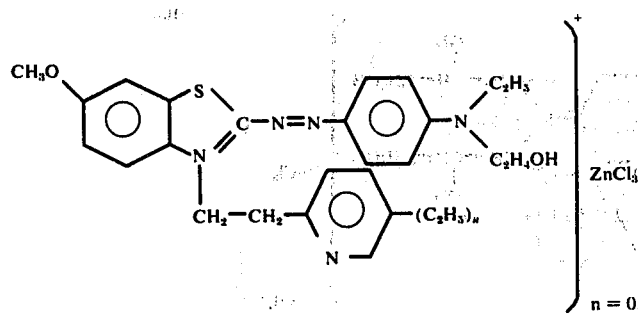 | Blue |
| 66 | 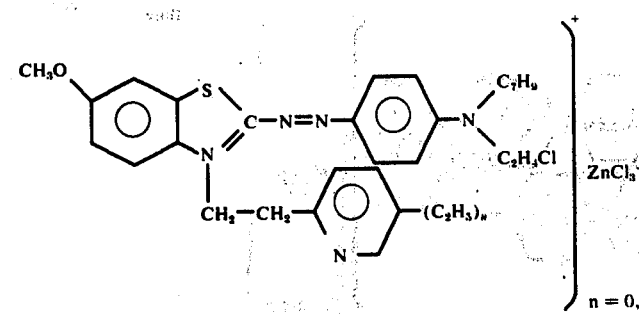 | Blue |
| 67 | 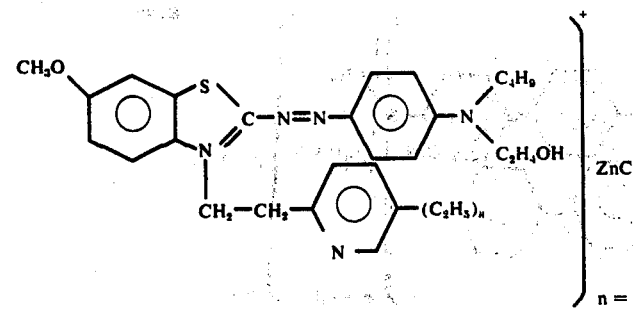 | Blue |

-continued
| Example No. | Structure of the dyestuff | Colour shade on polyacrylonitrile fibres |
|---|---|---|
| 68 | 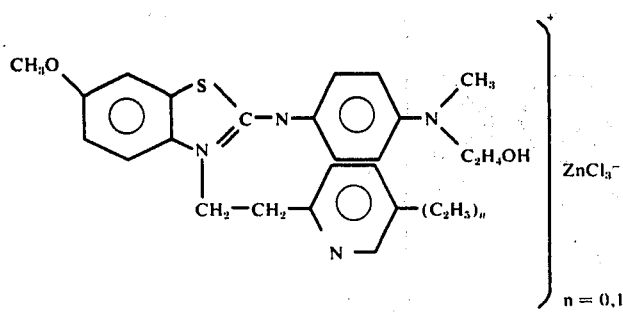 n = 0,1 | Blue |
| 69 | 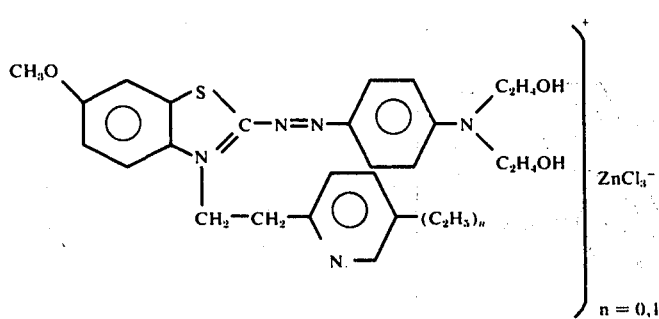 n = 0,1 | Blue |
| 70 | 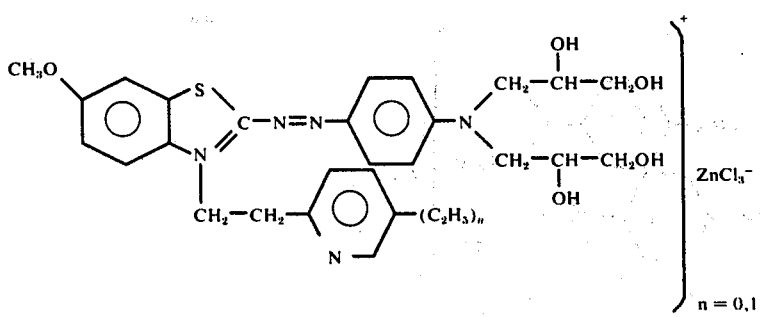 n = 0,1 | Blue |
| 71 | 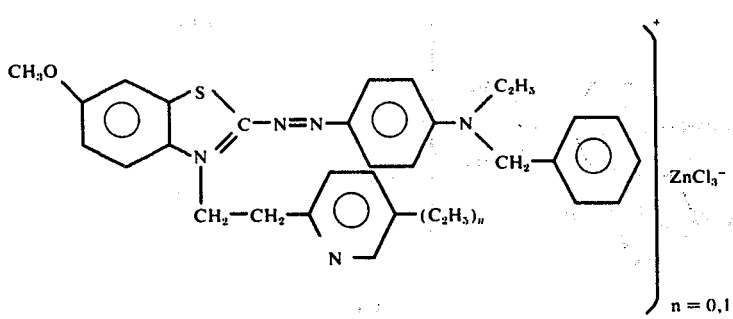 n = 0,1 | Blue |
| 72 | 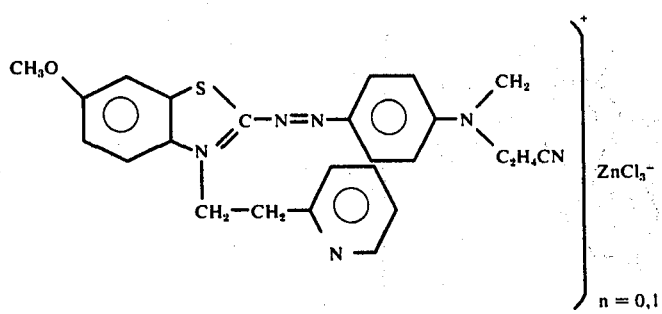 n = 0,1 | Blue |

-continued
| Example No. | Structure of the dyestuff | Colour shade on polyacrylonitrile fibres |
|---|---|---|
| 73 | 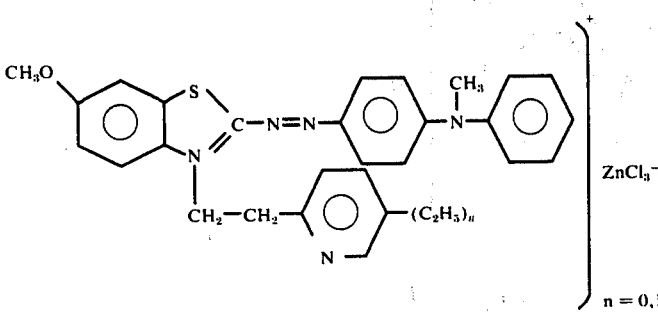 | Greenish-tinged blue |
| 74 | 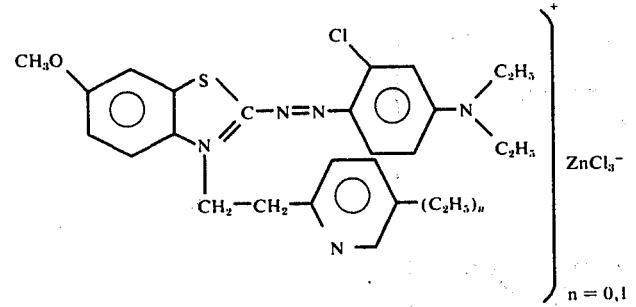 | Blue |
| 75 | 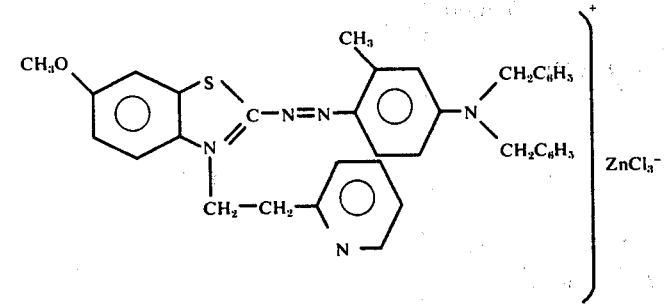 | Blue |
| 76 | 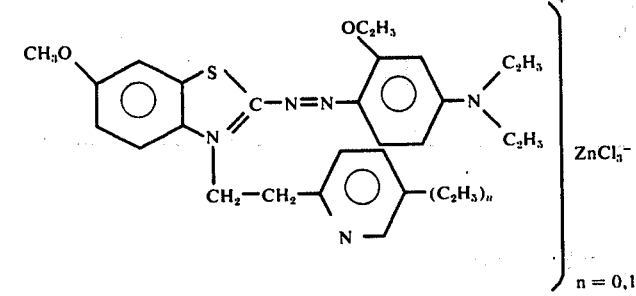 | Blue |
| 77 | 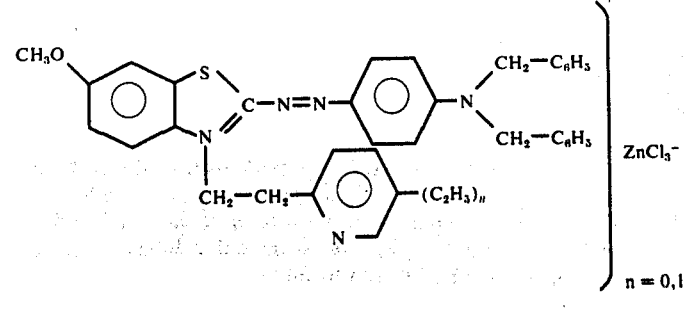 | Blue |

-continued

| Example No. | Structure of the dyestuff | | Colour shade on polyacrylonitrile fibres |
|---|---|---|---|
| 78 | [structure with CH₃O-benzothiazole-N=N-phenyl-N(C₄H₉)(C₂H₄Cl), CH₂-CH₂-pyridinium-CH₃]²⁺ | ZnCl₄²⁻ | Blue |
| 79 | [structure with CH₃O-benzothiazole-N=N-(CH₃-phenyl)-N(C₂H₅)(CH₂-C₆H₅), CH₂-CH₂-pyridinium-(C₂H₅)ₙ] n=0,1 ⁺ | ZnCl₃⁻ | Blue |
| 80 | [structure with CH₃O-benzothiazole-N=N-(CH₃-phenyl)-N(C₂H₅)(C₂H₄OH), CH₂-CH₂-pyridinium-(C₂H₅)ₙ] n=0,1 ⁺ | ZnCl₃⁻ | Blue |
| 81 | [structure with CH₃O-benzothiazole-N=N-phenyl-N(C₂H₅)(C₂H₄OH), CH₂CH-pyridinium] ⁺ | ZnCl₃⁻ | Blue |

EXAMPLE 82

A solution consisting of 9.54 parts of the dyestuff of the formula

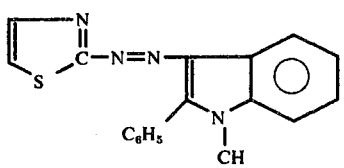

in 42 parts of formic acid is treated at 50° C with 9.45 parts of 2-vinylpyridine and the mixture is stirred for a further 5 hours at 80°. After pouring out the reaction solution into 225 parts of water, adding 3 parts of charcoal and boiling up, the dyestuff in the filtrate was precipitated by means of 25 parts of sodium chloride and 2.5 parts of zinc chloride. The dry, crystalline dyestuff of the formula

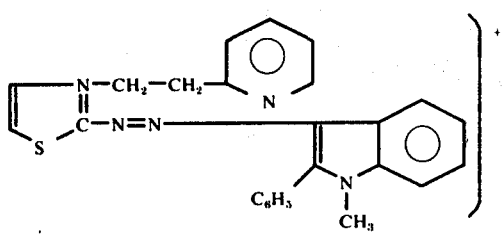

was obtained in an amount of 15 parts, and is pure according to thin layer chromatography.

A sample recrystallised from methanol gave the following analytical data:

$C_{25}H_{22}N_5S\ ZnCl_3$ (596.3)

| | C | H | Cl | N |
|---|---|---|---|---|
| Calculated | 50.36 | 3.72 | 17.84 | 11.75 |
| Found | 49.65 | 4.20 | 17.40 | 11.45 |

The clear red dyeings of this dyestuff on polyacrylonitrile fibres and acid-modified polyester materials or polyamide materials have outstandingly good fastness to light and to sublimation. If an analogous procedure is followed, further valuable and structurally similar dyestuffs can be obtained, the formulae of which are listed in the table which follows.

| Example No. | Structure of the dyestuff | Colour shade on polyacrylonitrile fibres |
|---|---|---|
| 83 | (structure with $(C_2H_5)_n$, $C_6H_5$, $C_2H_5$, $ZnCl_3^-$, n = 0,1) | Red |
| 84 | (structure with $C_6H_5$, $CH_2CH_2CH_3$, $ZnCl_3^-$) | Red |
| 85 | (structure with $C_6H_5$, $(CH_2)_3CH_3$, $ZnCl_3^-$) | Red |
| 86 | (structure with $C_2H_5$, $CH_2-CH(CH_3)-CH_3$, $ZnCl_3^-$) | Red |

| Example No. | Structure of the dyestuff | Colour shade on polyacrylonitrile fibres |
|---|---|---|
| 87 | 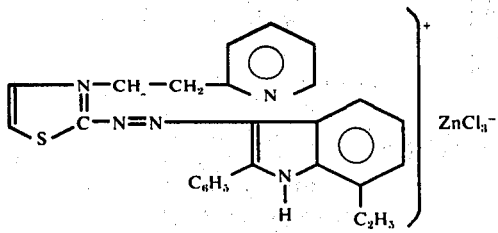 | Bluish-tinged red |
| 88 | 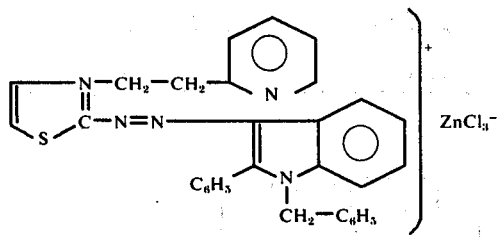 | Red |
| 89 | 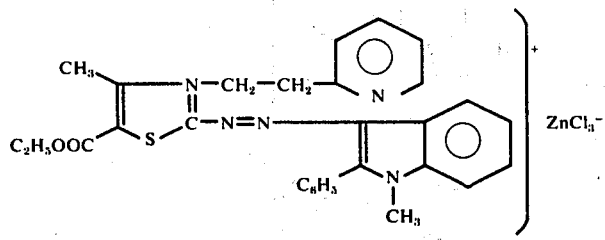 | Bluish-tinged red |
| 90 | 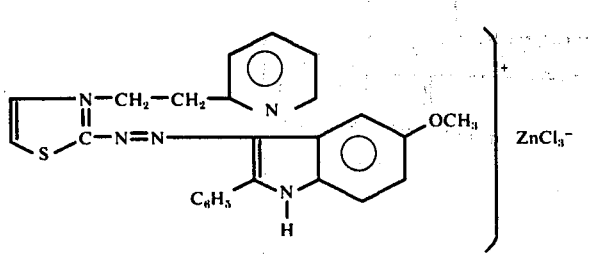 | Red |
| 91 | 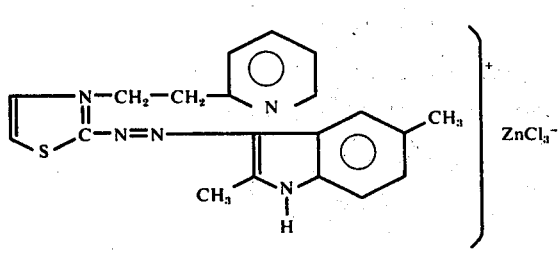 | Bluish-tinged red |
| 92 | 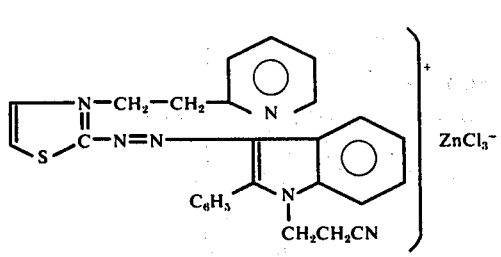 | Red |

-continued
| Example No. | Structure of the dyestuff | Colour shade on polyacrylonitrile fibres |
|---|---|---|
| 93 | 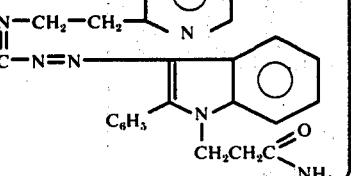 | Red |
| 94 | 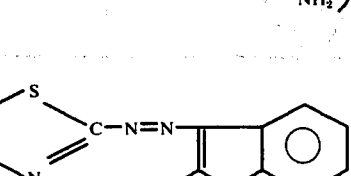 | Bluish-tinged red |
| 95 | 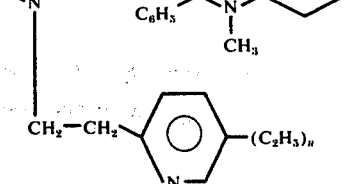 | Bluish-tinged claret |
| 96 | 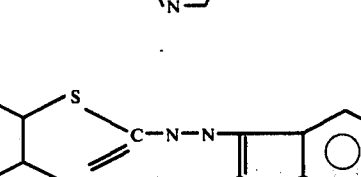 | Red-violet |
| 97 | 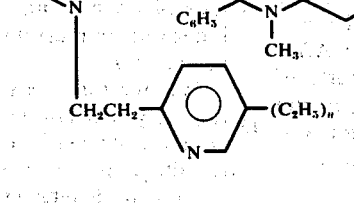 | Claret |

| Example No. | Structure of the dyestuff | Colour shade on polyacrylonitrile fibres |
|---|---|---|
| 98 | (structure shown) | Claret |

EXAMPLE 99

8.52 parts of the dyestuff of the formula (structure shown)

are dissolved in 36 parts of formic acid at 50° C, 12 parts of 2-vinyl-5-ethylpyridine are added whilst stirring and the mixture is heated at 80° for 4 hours. After pouring out the reaction solution into 100 parts of water, adding 3 parts of charcoal, briefly boiling up and precipitating with 70 parts of 30% strength aqueous zinc chloride solution, the dyestuff of the formula

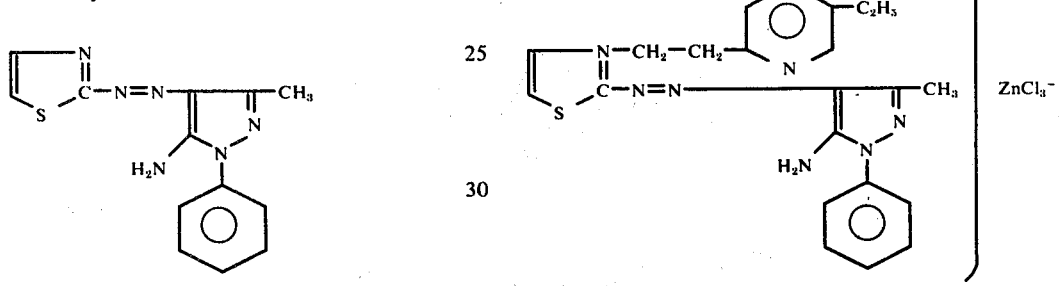

is obtained in an amount of 18 parts after drying; it can, if desired, be recrystallised from 10% strength aqueous acetic acid.

This dyestuff dyes polyacrylonitrile fibres, acid-modified polyester fabrics and polyamide fabrics in a clear golden yellow colour shade. The dyeings show an outstandingly high level of fastness to light and very good fastness to decatising.

Further similar dyestuffs, as listed below, can be isolated analogously to these instructions.

| Example No. | Structure of the dyestuff | Colour shade on polyacrylonitrile fibres |
|---|---|---|
| 100 | (structure shown) | Golden yellow |

| Example No. | Structure of the dyestuff | Colour shade on polyacrylonitrile fibres |
|---|---|---|
| 101 | 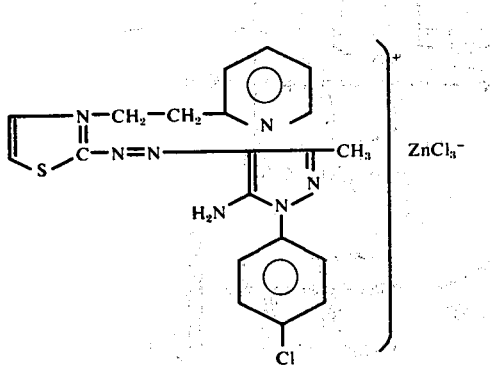 | Golden yellow |
| 102 | 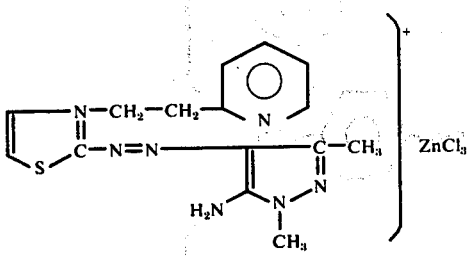 | golden yellow |
| 103 | 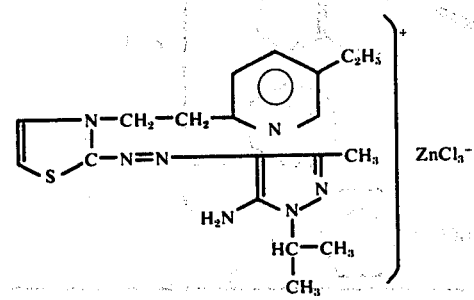 | Reddish-tinged yellow |
| 104 | 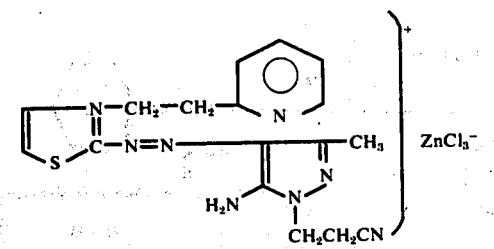 | Golden yellow |
| 105 | 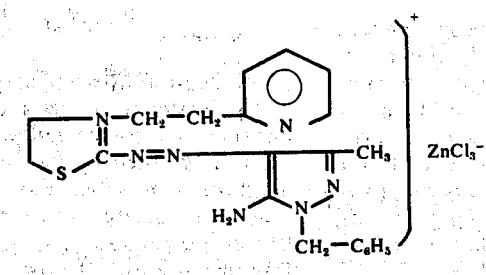 | Golden yellow |

-continued

| Example No. | Structure of the dyestuff | Colour shade on polyacrylonitrile fibres |
|---|---|---|
| 106 | 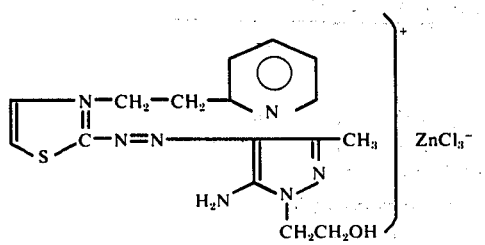 | Golden yellow |
| 107 | 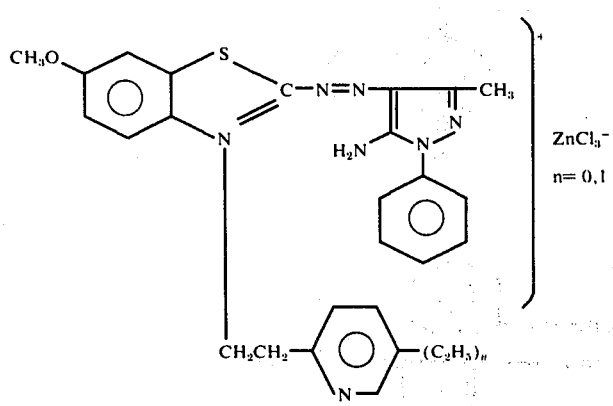 | Scarlet |
| 108 | 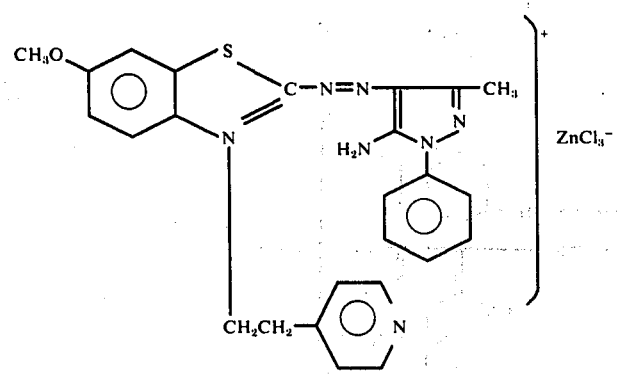 | Scarlet |

EXAMPLE 109

10 parts of the azo dyestuff of the formula

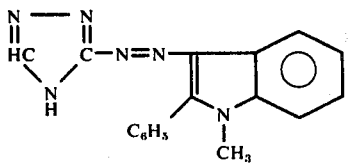

are stirred with 40 parts of formic acid at room temperature and after adding 10 parts of 2-vinylpyridine the mixture is heated for 5 hours at 90° C whilst stirring. After pouring out the reaction solution into 1,000 parts of water and boiling up using a little charcoal, the dyestuff of the structure shown below was obtained in a crystalline form after salting out with 200 parts of sodium chloride and 19 parts of 50% strength aqueous zinc chloride solution, the amount obtained after drying being 19 parts.

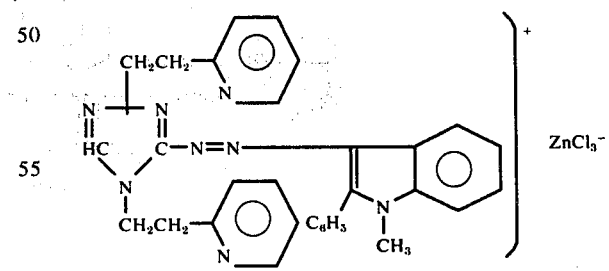

This dyestuff dyes polyacrylonitrile fibres, acid-modified polyester materials and acid-modified polyamide materials in a golden yellow colour shade. The dyeings are distinguished by their very good fastness to light and fastness to sublimation.

Further valuable and structurally similar dyestuffs can be prepared following a similar procedure; their formulae are listed below.

| Example No. | Structure of the dyestuff | | Colour shade on polyacrylonitrile fibres |
|---|---|---|---|
| 110 | 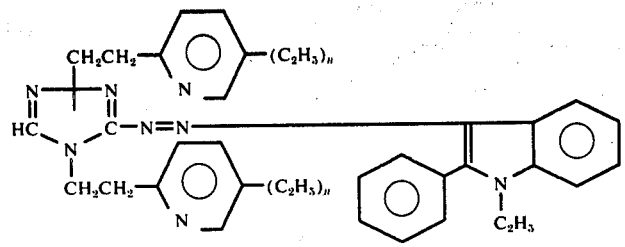 | ZnCl₃⁻  n=0.1 | Golden yellow |
| 111 | 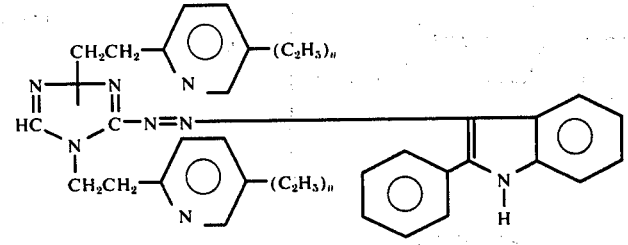 | ZnCl₃⁻  n=0.1 | Golden yellow |
| 112 | 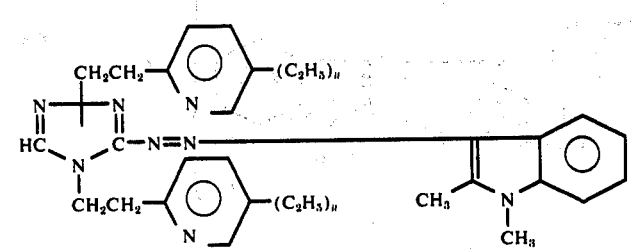 | ZnCl₃⁻  n=0.1 | Yellow |
| 113 | 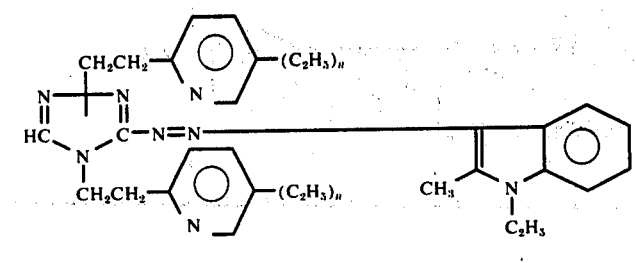 | ZnCl₃⁻  n=0.1 | Yellow |
| 114 | 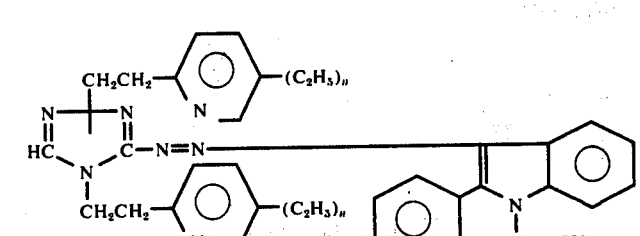 | ZnCl₃⁻  n=0.1 | Golden yellow |

| Example No. | Structure of the dyestuff | Colour shade on polyacrylonitrile fibres |
|---|---|---|
| 115 | 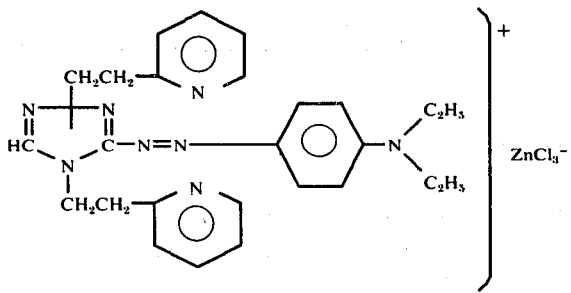 | Bluish-tinged red |
| 116 | 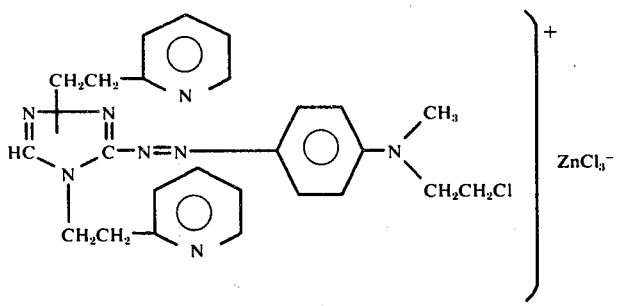 | Bluish-tinged red |
| 117 | 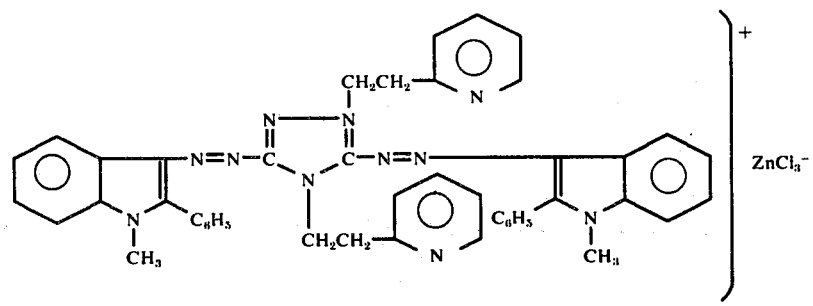 | Bluish-tinged red |
| 118 | 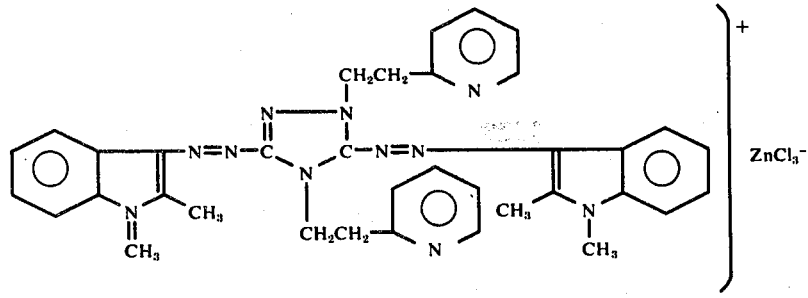 | Bluish-tinged red |

EXAMPLE 119

3.2 parts of the azo compound of the formula

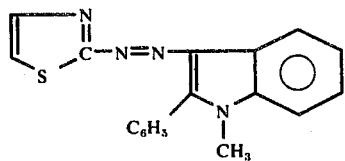

15 parts of formic acid and 4.9 parts of 2-β-hydroxyethylbenzimidazole are heated for 16 hours at 90°–95° C whilst stirring, the solution is poured out into 67 parts of water and the mixture is boiled up with 1 part of charcoal. The dyestuff of the formula

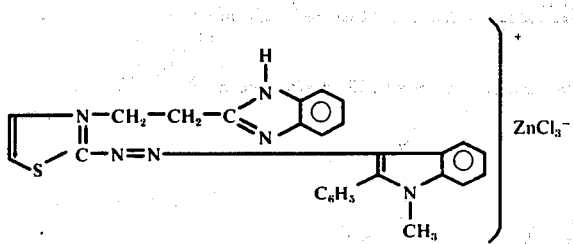

was precipitated from the filtrate by means of 5 parts of zinc chloride; 6.9 parts were isolated after drying and were recrystallised from dilute acetic acid.

This dyestuff dyes polyacrylonitrile fibres and acid-modified polyester fabrics and polyamide fabrics in a clear red shade. The dyeings possess outstandingly good general fastness properties.

The following valuable diazacyanine dyestuffs can be obtained analogously to these instructions, by reaction with 2-β-hydroxyethylbenzimidazole.

| Example No. | Structure of the dyestuff | Colour shade on polyacrylonitrile fabrics |
|---|---|---|
| 120 | | Red |
| 121 | | Red |
| 122 | | Red |
| 123 | | Bluish-tinged red |
| 124 | | Blue |

-continued

| Example No. | Structure of the dyestuff | Colour shade on polyacrylonitrile fabrics |
|---|---|---|
| 125 | (structure with thiazoline, benzimidazole, dimethylaminophenyl with CH₃) ZnCl₃⁻ | Reddish-tinged blue |
| 126 | (structure with thiazoline, benzimidazole, NO₂ and N(C₂H₅)₂ phenyl) ZnCl₃⁻ | Blue |
| 127 | (structure with thiazoline, benzimidazole, N-methyl-N-phenyl aminophenyl) ZnCl₃⁻ | Greenish-tinged blue |
| 128 | (benzothiazole with CH₂CH₂-benzimidazole, azo to diethylaminophenyl) ZnCl₃⁻ | Blue |
| 129 | (methoxybenzothiazole with CH₂CH₂-benzimidazole, azo to chloro-diethylaminophenyl) ZnCl₃⁻ | Blue |
| 130 | (triazine with two CH₂CH₂-benzimidazole groups, azo to diethylaminophenyl) ZnCl₃⁻ | Bluish-tinged red |

-continued

| Example No. | Structure of the dyestuff | Colour shade on polyacrylonitrile fabrics |
|---|---|---|
| 131 | (structure with ZnCl₃⁻) | Red |
| 132 | (structure with ZnCl₃⁻) | Yellow |
| 133 | (structure with ZnCl₃⁻) | Orange |
| 134 | (structure with ZnCl₃⁻) | Golden yellow |

EXAMPLE 135

6.4 parts of the azo compound of Example 119, 36 parts of formic acid and 8.8 parts of 1-methyl-2-β-hydroxyethylbenzimidazole are heated for 16 hours at 80° C whilst stirring. After pouring out the solution into 200 parts of water, boiling up with a little charcoal and filtering, the dyestuff of the formula

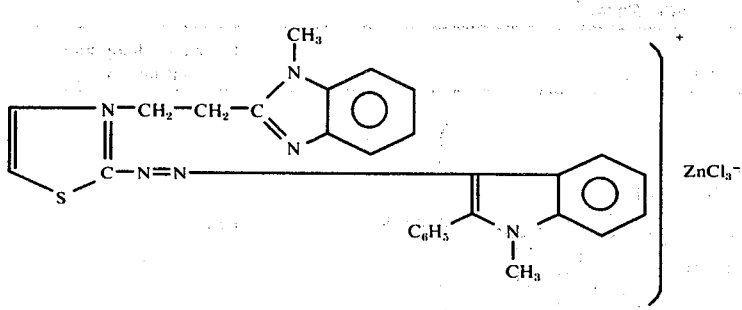

was precipitated with 35 parts of sodium chloride and 4 parts of zinc chloride, and 12 parts of it were isolated after drying.

After being dissolved in dimethylformamide at 95°–100° C, this dyestuff can be methylated with dimethyl sulphate to give the dyestuff of the probable structure

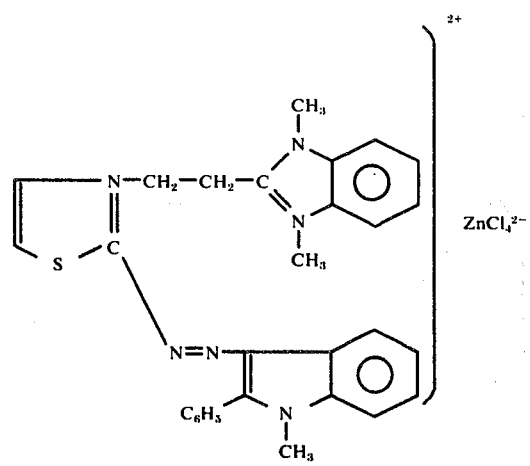

Both the non-methylated dyestuff and the methylated dyestuff give excellent red dyeings, which are fast to light and to decatising, on polyacrylonitrile materials and acid-modified polyester fabrics and polyamide fabrics.

The new valuable diazacyanine dyestuffs listed below can also be manufactured according to this instruction, by reaction with 1-methyl-2-β-hydroxyethylbenzimidazole.

| Example No. | Structure of the dyestuff | Colour shade on poly-acrylonitrile fabrics |
|---|---|---|
| 136 | 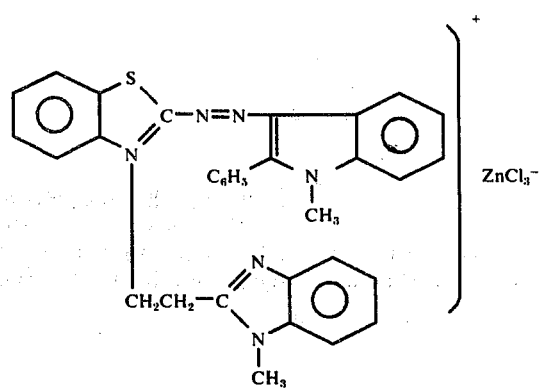 | Bluish-tinged red |

-continued

| Example No. | Structure of the dyestuff | Colour shade on poly-acrylonitrile fabrics |
|---|---|---|
| 137 | [structure with CH₃O-benzothiazole, N=N, indole with C₆H₅, CH₂CH₂-benzimidazole-CH₃]⁺ ZnCl₃⁻ | Red-violet |
| 138 | [thiazole-N-CH₂-CH₂-benzimidazole(CH₃), C-N=N-phenyl-N(C₂H₅)₂]⁺ ZnCl₃⁻ | Blue |
| 139 | [thiazole-N-CH₂-CH₂-benzimidazole(CH₃), C-N=N-phenyl(Cl)-N(C₂H₅)₂]⁺ ZnCl₃⁻ | Blue |
| 140 | [benzothiazole-C-N=N-phenyl-N(C₂H₅)₂, N-CH₂CH₂-benzimidazole-CH₃]⁺ ZnCl₃⁻ | Blue |
| 141 | [CH₃O-benzothiazole-C-N=N-phenyl-N(C₂H₅)₂, N-CH₂CH₂-benzimidazole-CH₃]⁺ ZnCl₃⁻ | Blue |

-continued
| Example No. | Structure of the dyestuff | Colour shade on poly-acrylonitrile fabrics |
|---|---|---|
| 142 | 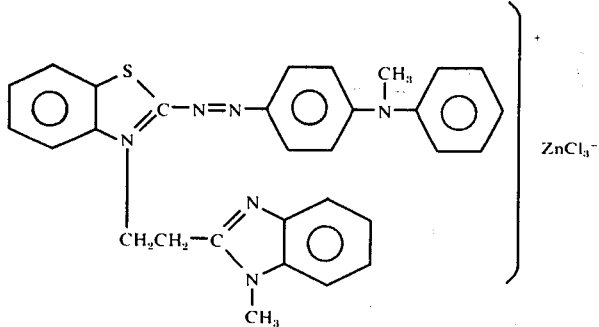 | Greenish-tinged blue |
| 143 | 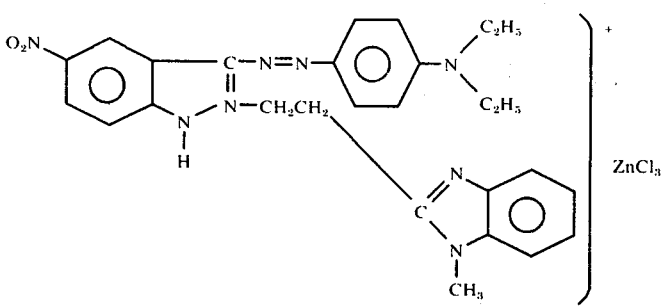 | Bluish-tinged red |
| 144 | 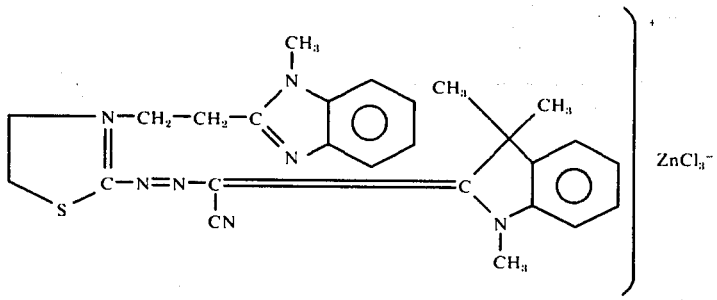 | Red |
| 145 | 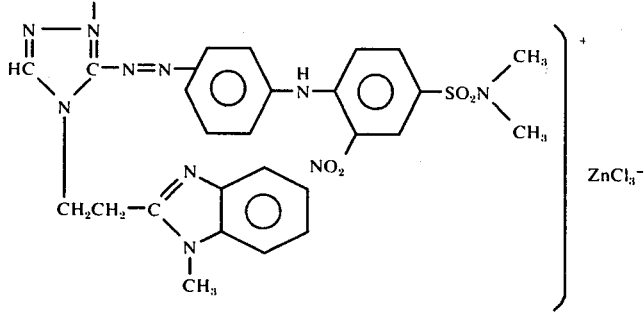 | Blue |
EXAMPLE 146
9.5 parts of the azo dyestuff of Example 119, 36 parts of formic acid and 10.7 parts of 2-β-hydroxyethylbenzthiazole were stirred for 5 hours at 80° C and 16 hours at room temperature and the dyestuff of the formula

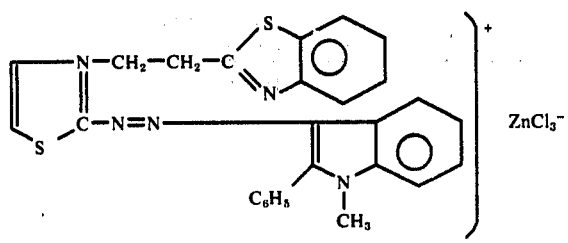

is obtained by pouring out the dark red reaction solution into 200 parts of water, briefly boiling up the mixture with a little charcoal and precipitation with 10 parts of zinc chloride in the filtrate. The yield of crystalline, dry dyestuff which is pure according to thin layer chromatography was 13.2 parts.

This dyestuff dyes polyacrylonitrile fibres, acid-modified polyester material and polyamide material in a clear red colour shade. The dyeings have an excellent level of fastness to light and to decatising.

Further valuable diazacyanine dyestuffs can be obtained analogously by reaction with 2-β-hydroxyethyl-benzthiazole; their structures are listed below.

| Example No. | Structure of the dyestuff | Colour shade on polyacrylonitrile fibres |
|---|---|---|
| 147 | | Red |
| 148 | | Bluish-tinged red |
| 149 | | Bluish-tinged claret |
| 150 | | Red-violet |

| Example No. | Structure of the dyestuff | Colour shade on polyacrylonitrile fibres |
|---|---|---|
| 151 | 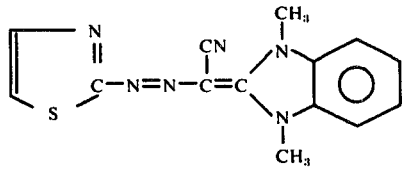 | Bluish-tinged red |

EXAMPLE 152

8.9 parts of the azo dyestuff of the formula

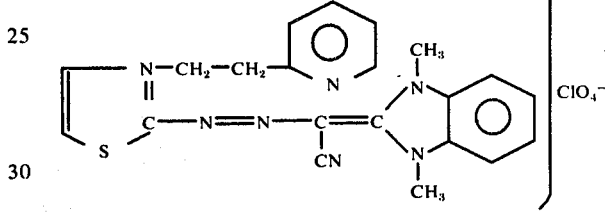

are dissolved in 40 parts of formic acid at 50° C, 9.45 parts of 2-vinylpyridine are added whilst stirring and the mixture is heated for a further 3 hours at 80°.

After pouring out the reaction solution into 200 parts of warm water, the aqueous dyestuff solution is boiled up using 3 parts of charcoal and is filtered, and the dyestuff of the following structure is precipitated with 5 parts of 70% strength perchloric acid After drying in vacuo, 9.1 parts of dyestuff of melting point 238°–240° C are obtained.

This dyestuff dyes polyacrylonitrile in a clear yellow colour shade. The dyeing has good general fastness properties.

The valuable dyestuffs listed below can also be isolated if a similar procedure is followed.

| Example No. | Structure of the formula | Colour shade on polyacrylonitrile fibres |
|---|---|---|
| 153 | | Yellow |
| 154 | | Yellow |

| Example No. | Structure of the formula | Colour shade on polyacrylonitrile fibres |
|---|---|---|
| 155 | 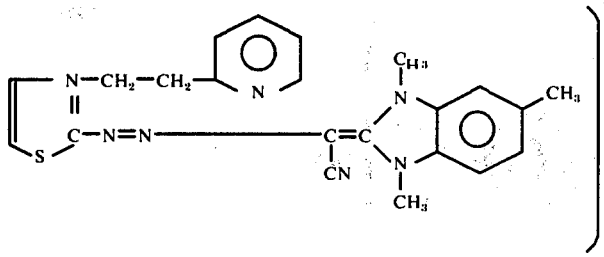 | Yellow |
| 156 | 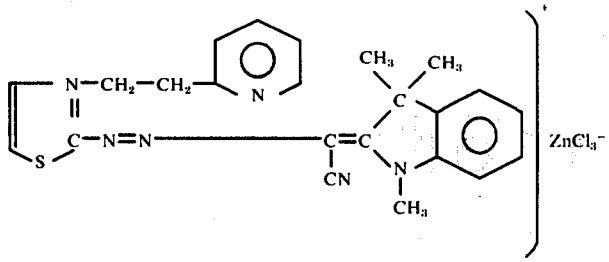 | Red |
| 157 | 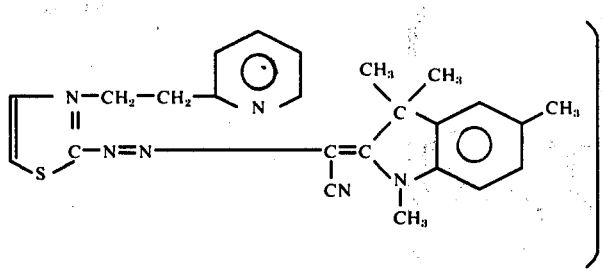 | Red |
| 158 | 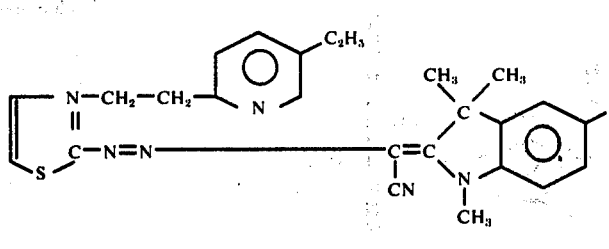 | Red |
| 159 | 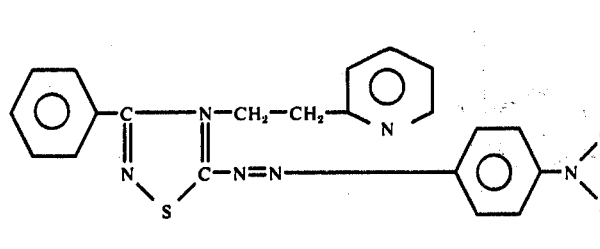 | Bluish-tinged red |
| 160 | 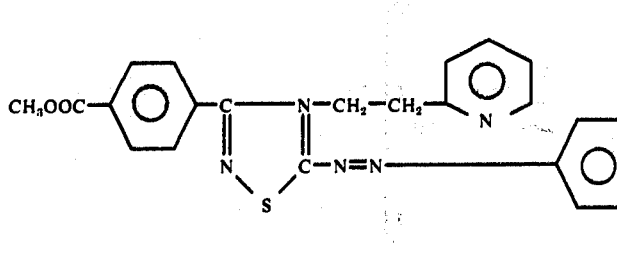 | Bluish-tinged red |

-continued
| Example No. | Structure of the formula | Colour shade on polyacrylonitrile fibres |
|---|---|---|
| 161 | 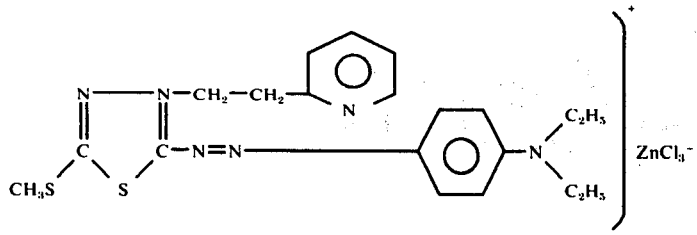 | Violet |
| 162 | 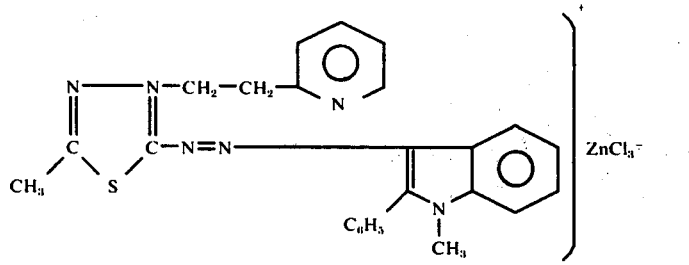 | Reddish-tinged orange |
| 163 | 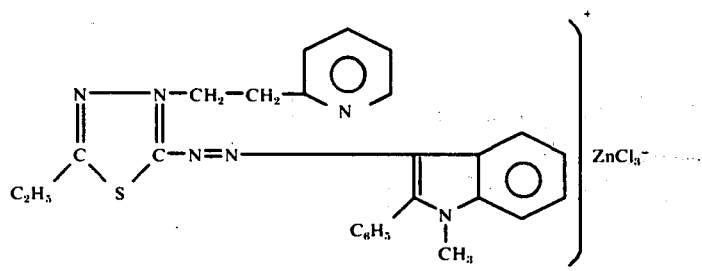 | Orange |
| 164 | 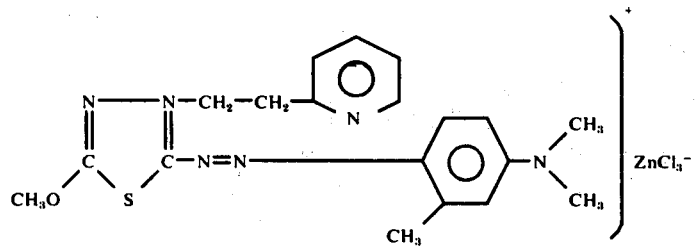 | Reddish-tinged violet |
| 165 | 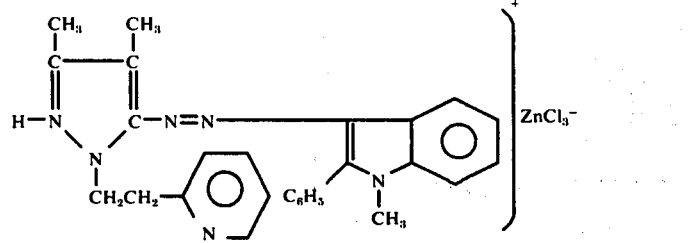 | Yellow |
| 166 | 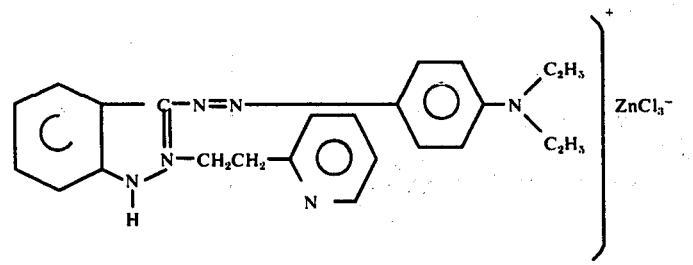 | Red |

-continued

| Example No. | Structure of the formula | Colour shade on polyacrylonitrile fibres |
|---|---|---|
| 167 | 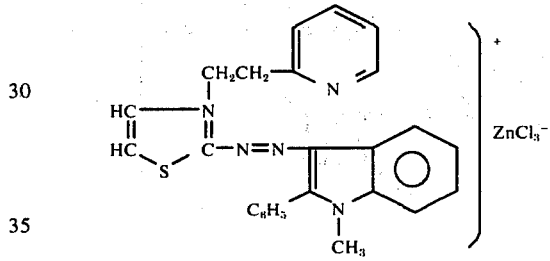 | Bluish-tinged red |
| 168 | 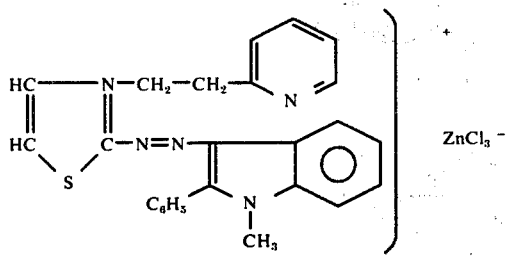 | Yellow |

EXAMPLE 169

Using a liquor ratio of 1:40, polyacrylonitrile fibres are introduced into an aqueous bath at 40° which contains, per litre, 0.75 g of 30% strength acetic acid, 0.38 g of sodium acetate and 0.5 g of the dyestuff of the formula

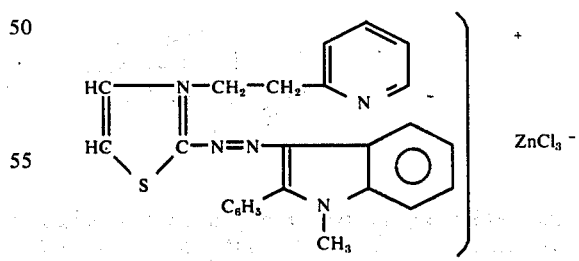

The dyebath is heated to the boil over the course of 20 – 30 minutes and is kept at this temperature for 30 – 60 minutes. Thereafter the polyacrylonitrile fibres are rinsed and dried. They are dyed in a clear red with an excellent general level of fastness.

EXAMPLE 170

Using a liquor ratio of 1:40, acid-modified polyglycol terephthalate fibres are introduced into an aqueous bath at 20° which contains, per litre, 6–10 g of sodium sulphate, 0.5 – 1 g of oleyl polyglycol ether (50 mols of ethylene oxide), 0–15 g of dimethyl-benzyl-dodecylammonium chloride and 0.5 g of the dyestuff S and which has been adjusted to pH 4–5 with acetic acid. The bath is heated to 100° C over the course of 30 minutes and is kept at this temperature for 60 minutes. Thereafter the fibres are rinsed and dried. A red dyeing having very good fastness properties is obtained.

EXAMPLE 171

A polyacrylonitrile fabric is printed with a printing paste which was manufactured as follows:

50 parts by weight of the dyestuff of the formula 50 parts of thiodiethylene glycol, 30 parts of cyclohexanol and 30 parts of 30% strength acetic acid are covered with 330 parts of hot water and the resulting solution is added to 500 g of crystal gum (gum arabic as thickener). Finally, 30 parts of zinc nitrate solution are also added. The resulting print is dried, steamed for 30 minutes and subsequently rinsed. A clear red print having very good fastness properties is obtained.

EXAMPLE 172

A stock solution of the dyestuff mentioned in Example 169 is prepared from 15 parts by weight of the dyestuff, 15 parts by weight of polyacrylonitrile and 70 parts by weight of dimethylformamide; this stock solution is added to the customary spinning solution, which is spun in a known manner. A red fibre of very good fastness properties is obtained.

EXAMPLE 173

Using a liquor ratio of 1:40, acid-modified synthetic polyamide fibres are introduced into an aqueous bath at 40° C which contains, per litre, 10 g of sodium acetate, 1 to 5 g of oleyl polyglycol ether (50 mols of ethylene oxide) and 0.3 g of the dyestuff described in Example 169 and which has been adjusted to pH 4-5 with acetic acid. The bath is heated to 98° C over the course of 30 minutes and is kept at this temperature. Thereafter the fibres are rinsed and dried. A red dyeing having very good fastness properties is obtained.

We claim:

1. Dyestuff of the formula

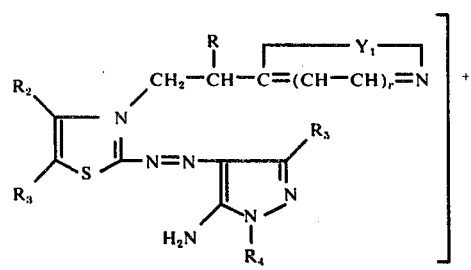

wherein $R_2$ and $R_3$ independently of one another are hydrogen, $C_1-C_4$-alkyl, phenyl, halogen, nitro, cyano, thiocyano, $C_1-C_4$-alkoxy, phenoxy, benzyloxy, $C_1-C_4$-alkylmercapto, $C_1-C_4$-alkylsulphonyl, aminosulphonyl, acetyl, benzoyl, acetylamino, benzoylamino, $C_1-C_4$-alkylsulphonylamino, $C_1-C_4$-alkoxycarbonyl, phenoxycarbonyl, aminocarbonyl or carboxyl; or $R_2$ and $R_3$ taken together form a cyclohexene or benzene ring which is unsubstituted or substituted by $R_2$;

$R_4$ is hydrogen, $C_1-C_4$-alkyl, phenyl, cyclohexyl or benzyl;

$R_5$ is hydrogen, $C_1-C_4$-alkyl or $C_1-C_4$-alkoxy; $Y_1$ together with C=(CH-CH)$_r$=N forms pyridine, quinoline, imidazole, benzimidazole, thiazole, benzthiazole or pyrimidine ring, which ring is unsubstituted or substituted by one or two members selected from the group consisting of methyl, methoxymethyl, ethyl, phenyl and dimethylamino;

R is hydrogen or alkyl of 1 to 4 carbon atoms; $An^{(-)}$ is an anion; and r is 0 or 1.

2. Dyestuff of the formula

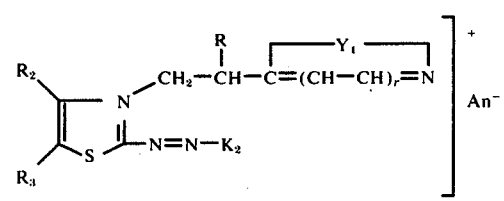

wherein

R is hydrogen or $C_1-C_4$-alkyl;

$R_2$ and $R_3$ independently of one another are hydrogen, $C_1-C_4$-alkyl, phenyl, halogen, nitro, cyano, thiocyano, $C_1-C_4$-alkoxy, phenoxy, benzyloxy, $C_1-C_4$-alkylmercapto, $C_1-C_4$-alkylsulphonyl, aminosulphonyl, acetyl, benzoyl, acetylamino, benzoylamino, $C_1-C_4$-alkylsulphonylamino, $C_1-C_4$-alkoxycarbonyl, phenoxycarbonyl, aminocarbonyl or carboxyl; or $R_2$ and $R_3$ taken together form a cyclohexene or benzene ring which is unsubstituted or substituted by $R_2$;

$Y_1$ together with C-(CH-CH)$_r$=N forms pyridine, quinoline, imidazole, benzimidazole, thiazole, benzthiazole or pyrimidine ring, which ring is unsubstituted or substituted by one or two members selected from the group consisting of methyl, methoxymethyl, ethyl, phenyl and dimethylamino;

$An^{(-)}$ is an anion;

r is 0 or 1;

$K_2$ is

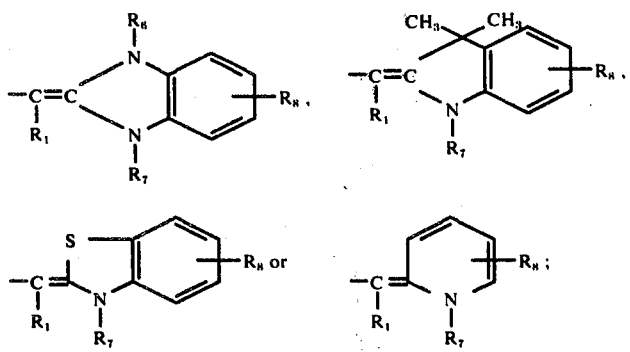

$R_1$ is CN, $CONH_2$ or COOH;

$R_6$ and $R_7$ are $C_1-C_4$-alkyl; and $R_8$ is hydrogen, $C_1-C_4$-alkyl, $C_1-C_4$-alkoxy, halogen or acetylamino.

3. Dyestuff of the formula

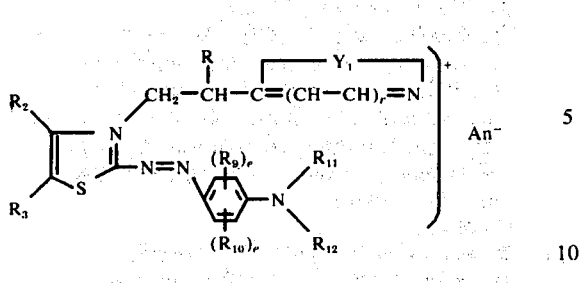

wherein

R is hydrogen or $C_1$–$C_4$-alkyl;

$R_2$ and $R_3$ independently of one another are hydrogen, $C_1$–$C_4$-alkyl, phenyl, halogen, nitro, cyano, thiocyano, $C_1$–$C_4$-alkoxy, phenoxy, benzyloxy, $C_1$–$C_4$-alkylmercapto, $C_1$–$C_4$-alkylsulphonyl, aminosulphonyl, acetyl, benzoyl, acetylamino, benzoylamino, $C_1$–$C_4$-alkylsulphonylamino, $C_1$–$C_4$-alkoxycarbonyl, phenoxycarbonyl, aminocarbonyl or carboxyl; or $R_2$ and $R_3$ taken together form a cyclohexene or benzene ring which is unsubstituted or substituted by $R_2$;

$Y_1$ together with C-(CH-CH)$_r$=N forms pyridine, quinoline, imidazole, benzimidazole, thiazole, benzthiazole or pyrimidine ring, which ring is unsubstituted or substituted by one or two members selected from the group consisting of methyl, methoxymethyl, ethyl, phenyl and dimethylamino;

An $^{(-)}$ is an anion;

$R_9$ is hydrogen, halogen, $C_1$–$C_4$-alkyl, cyano, $C_1$–$C_4$-alkoxy, $C_1$–$C_2$-alkyl carbonyloxy, amino, $C_1$–$C_2$-alkylcarbonylamino, nitro or ureido;

$R_{10}$ is hydrogen, $C_1$–$C_4$-alkyl, $C_1$–$C_4$-alkoxy, or $C_1$–$C_4$-alkylcarbonylamino; or $R_9$ and $R_{10}$ together form a fused benzene ring;

$e$ is 1 or 2;

$R_{11}$ and $R_{12}$ independently of one another are hydrogen, $C_1$–$C_{12}$-alkyl, phenyl, or benzyl, or $R_{11}$ and $R_{12}$ together with N form a morpholine, piperidine, pyrrlidine, piperazine or thiomorpholine ring; or $R_9$ and $R_{11}$ together form a member for closing a morpholine, tetrahydropyridine, indole, imidazole or pyrroline ring; and $r$ is 0 or 1.

4. Dyestuff of the formula

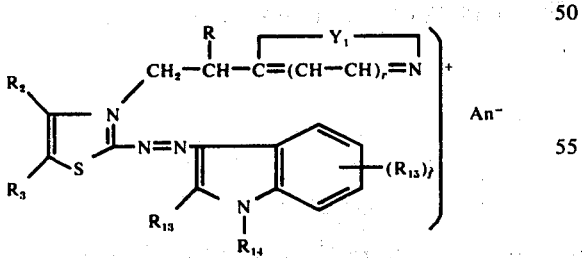

wherein

R is hydrogen or $C_1$–$C_4$-alkyl;

$R_2$ and $R_3$ independently of one another are hydrogen, $C_1$–$C_4$-alkyl, phenyl, halogen, nitro, cyano, thiocyano, $C_1$–$C_4$-alkoxy, phenoxy, benzyloxy, $C_1$–$C_4$-alkylmercapto, $C_1$–$C_4$-alkylsulphonyl, aminosulphonyl, acetyl, benzoyl, acetylamino, benzoylamino, $C_1$–$C_4$-alkylsulphonylamino, $C_1$–$C_4$-alkoxycarbonyl, phenoxycarbonyl, aminocarbonyl or carboxyl; or $R_2$ and $R_3$ taken together form a cyclohexene or benzene ring which is unsubstituted or substituted by $R_2$;

$Y_1$ together with C-(CH-CH)$_r$=N forms pyridine, quinoline, imidazole, benzimidazole, thiazole, benzthiazole or pyrimidine ring, which ring is unsubstituted or substituted by one or two members selected from the group consisting of methyl, methoxymethyl, ethyl, phenyl and dimethylamino;

An $^{(-)}$ is an anion;

$r$ is 0 or 1;

$R_{13}$ is $C_1$–$C_6$-alkyl, phenyl or benzyl;

$R_{14}$ is hydrogen, $C_1$–$C_6$-alkyl, $C_3$–$C_6$-alkenyl or $C_3$–$C_6$-alkinyl, benzyl or phenylethyl; $R_{15}$ is hydrogen, $C_1$–$C_4$-alkyl, $C_1$–$C_4$-alkoxy or halogen; and $f$ is 1 or 2.

5. Dyestuff of the formula

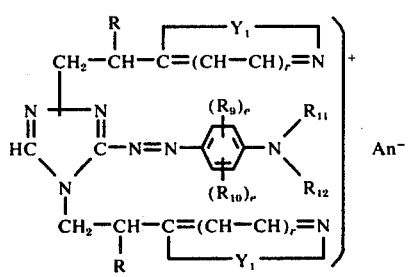

wherein

R is hydrogen or $C_1$–$C_4$-alkyl; $Y_1$ together with C-(CH-CH)$_r$=N forms pyridine, quinoline, imidazole, benzimidazole, thiazole, benzthiazole or pyrimidine ring, which ring is unsubstituted or substituted by one or two members selected from the group consisting of methyl, methoxymethyl, ethyl, phenyl and dimethylamino;

An $^{(-)}$ is an anion;

$R_9$ is hydrogen, halogen, $C_1$–$C_4$-alkyl, cyano, $C_1$–$C_4$-alkoxy, $C_1$–$C_2$-alkyl carbonyloxy, amino, $C_1$–$C_2$-alkylcarbonylamino, nitro or ureido;

$R_{10}$ is hydrogen, $C_1$–$C_4$-alkyl, $C_1$–$C_4$-alkoxy, or $C_1$–$C_4$-alkylcarbonylamino; or $R_9$ and $R_{10}$ together form a fused benzene ring;

$e$ is 1 or 2;

$R_{11}$ and $R_{12}$ independently of one another are hydrogen, $C_1$–$C_{12}$-alkyl, phenyl, benzyl, dimethylamino or methylphenylamino; or $R_{11}$ and $R_{12}$ together with N form a morpholine, piperidine, pyrroline, piperazine or thiomorpholine ring; or $R_9$ and $R_{11}$ together with N form a member for closing a morpholine, tetrahydropyridine, indole, imidazole or pyrroline ring; and $r$ is 0 or 1.

6. Dyestuff of the formula

[Structural formula with CH₂—CH—C=(CH—CH)ᵣ=N groups, imidazole ring, C—N=N linked to indole with (R₁₅)f, An⁻]

wherein

R is hydrogen or $C_1$-$C_4$-alkyl;

$Y_1$ together with C-(CH–CH)$_r$=N forms pyridine, quinoline, imidazole, benzimidazole, thiazole, benzthiazole or pyrimidine ring, which ring is unsubstituted or substituted by one or two members selected from the group consisting of methyl, methoxymethyl, ethyl, phenyl and dimethylamino;

An$^{(-)}$ is an anion;

r is 0 or 1;

$R_{13}$ is $C_1$-$C_6$-alkyl, phenyl or benzyl;

$R_{14}$ is hydrogen, $C_1$-$C_6$-alkyl or $C_3$-$C_6$-alkenyl or $C_3$-$C_6$-alkinyl, benzyl or phenylethyl;

$R_{15}$ is hydrogen, $C_1$-$C_4$-alkyl, $C_1$-$C_4$-alkoxy or halogen; and f is 1 or 2.

7. Dyestuff according to claim 1 of the formula

[Structural formula: methoxy-benzothiazole with N-CH₂-CH₂-pyridyl substituent, linked via N=N to C=C(CH₃)-N ring with H₂N, C₆H₅ substituents, ZnCl₃⁻]

8. Dyestuff according to claim 3 of the formula

[Structural formula: thiazole N-CH₂-CH₂-pyridyl, C-N=N-phenyl-N(C₂H₅)₂, ZnCl₃⁻]

9. Dyestuff according to claim 3 of the formula

[Structural formula: thiazole N-CH₂-CH₂-pyridyl, C-N=N-phenyl (with NO₂)-N(C₂H₅)₂, ZnCl₃⁻]

10. Dyestuff according to claim 3 of the formula

11. Dyestuff according to claim 4 of the formula
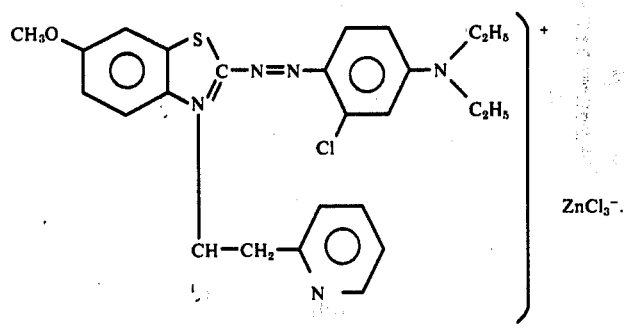
ZnCl₃⁻.
12. Dyestuff according to claim 4 of the formula
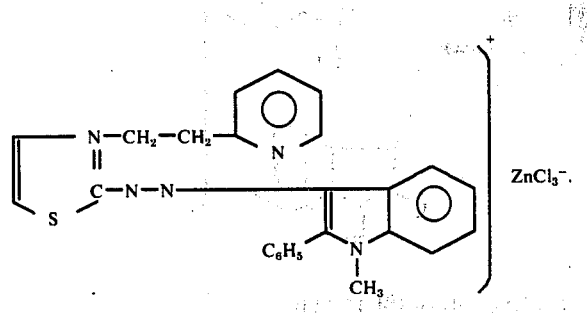
ZnCl₃⁻.
13. Dyestuff according to claim 6 of the formula
14. Dyestuff of the formula
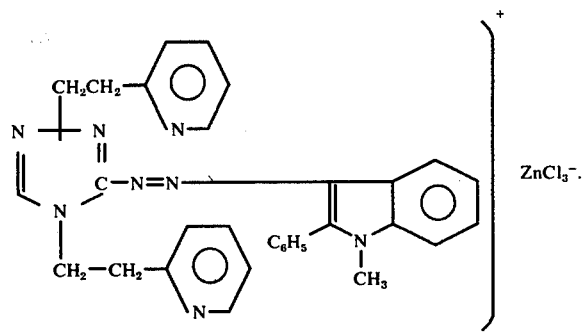
ZnCl₃⁻.
15. Dyestuff of the formula
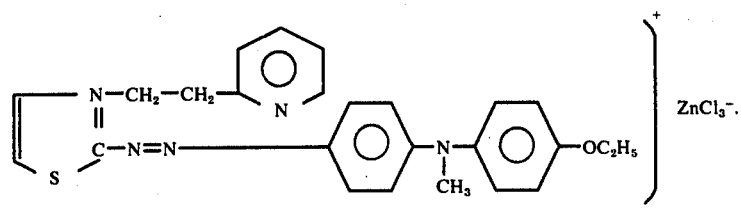
ZnCl₃⁻.

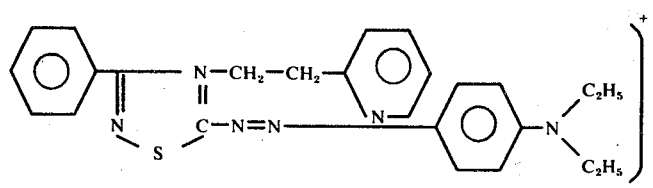
16. Dyestuff of the formula
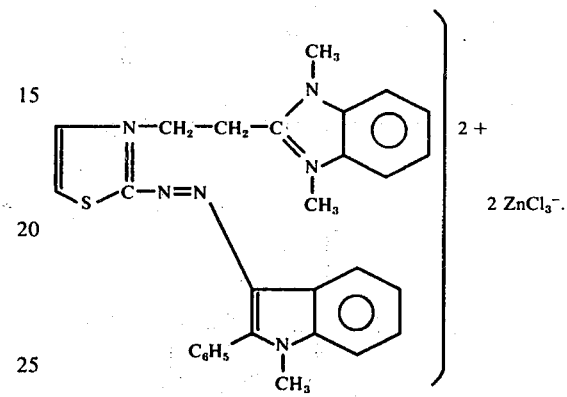
17. Dyestuff of the formula
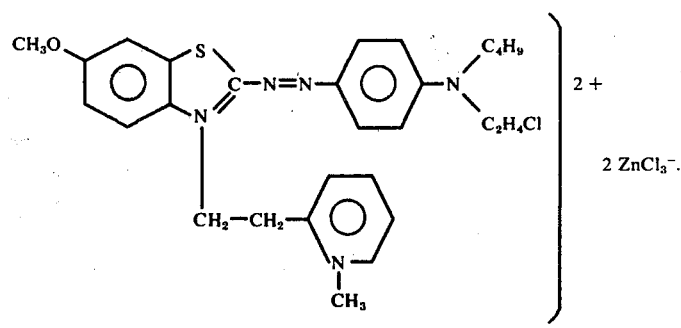
* * * * *